April 14, 1970 M. E. OZENBERGER 3,506,790
SIMULTANEOUS TRANSFER CONFERENCE SYSTEM
Filed June 22, 1966 29 Sheets-Sheet 15

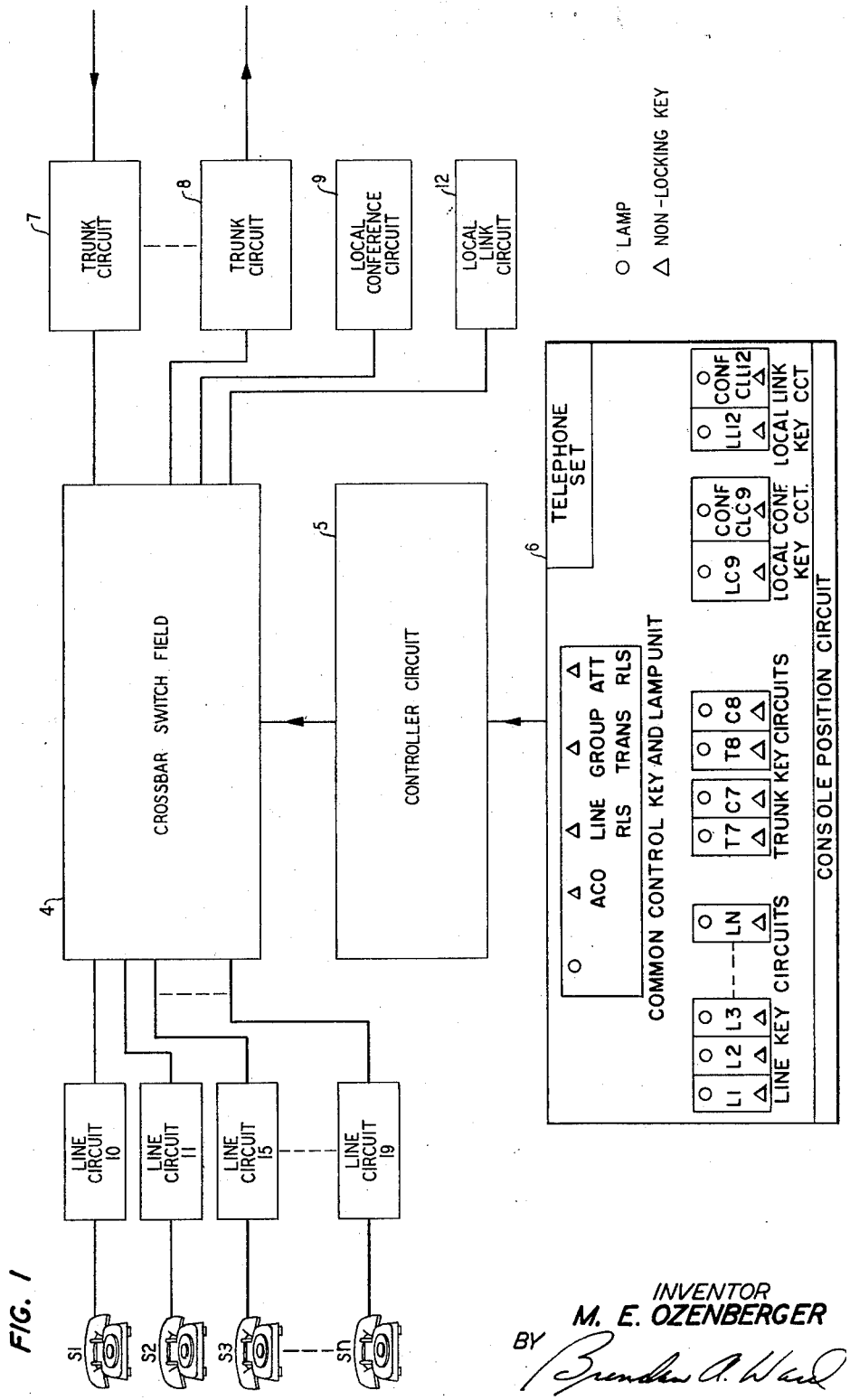

April 14, 1970     M. E. OZENBERGER     3,506,790
SIMULTANEOUS TRANSFER CONFERENCE SYSTEM
Filed June 22, 1966     29 Sheets-Sheet 29

United States Patent Office 3,506,790
Patented Apr. 14, 1970

3,506,790
SIMULTANEOUS TRANSFER CONFERENCE SYSTEM
Milton E. Ozenberger, Summit, N.J., assignor to Bell Telephone Laboratories, Incorporated, Murray Hill and Berkeley Heights, N.J., a corporation of New York
Filed June 22, 1966, Ser. No. 559,527
Int. Cl. H04m 3/56
U.S. Cl. 179—27            8 Claims

ABSTRACT OF THE DISCLOSURE

A telephone key type switching system is arranged to establish a conference connection between a plurality of stations and thence via a particular channel to another remote station. The console-coordinated key controlled switching system employs a crossbar switch field as the network media for interconnection of the stations and for connecting stations to communication channels terminating in the external telephone network. Control circuitry, including a memory capable of recording reconnection of conference lines, allows the group of conference stations to be subsequently transferred en masse from one conference channel to any other conference channel.

---

This invention relates generally to switching systems and particularly to equipment arrangements within such systems for establishing a conference connection between a plurality of stations and thence via a particular channel to another station. More particularly, this invention pertains to an arrangement for performing the foregoing and further operable to selectively transfer a plurality of such conferee-stations en masse from any one such channel to any other arbitrarily selected channel.

The volume of prior art in the area of communication conference arrangements is convincing testimony to the value of the conference connection as an adjunct to conventional station-to-station intercommunication. In recent years, the improvement of switching systems has significantly enhanced the speed and flexibility with which such station-to-station interconnection is accomplished. Concurrently, the ever-increasing use of the conference connection has led to a demand for similar speed and flexibility. This demand persists even though the technical problems presented are more severe since many stations are involved in each conference connection.

The need for increased flexibility and speed in this area is particularly apparent when a typical key type switching system is examined. Normally, such systems provide access between a plurality of stations and from such stations to other remote stations via trunks to the telephone network. Key type systems are typically provided at utility control points, police headquarters, and military installations, all of which require rapid and flexible interconnection of associated stations. Inherent in such installation is the need for the conferencing technique so as to permit a principal station to simultaneously communicate with diverse subordinate stations. Often it is necessary to subsequently reconnect a portion or all of the same subordinate stations in conference to a totally different principal station which may be located at a point thousands of miles from the original one. In the past this has been accomplished by releasing the initial conference connection and re-establishing essentially the same connection with respect to the newly added distant station. Obviously, such disconnection and reconnection is inefficient, expensive and time consuming and thus contradicts the objects for which the key type system was initially provided.

Accordingly, it is an object of my invention to permit the transfer of a group of station conferees en masse from a priorly selected communication path to a subsequently selected communication path in a rapid and expeditious manner.

It is another object of my invention to provide the aforesaid en masse transfer in a simple manner not requiring advance instruction to the conferees.

It is a further object of my invention to provide the foregoing objects in an economical manner not requiring the provision of expensive and complicated control equipment.

These and other objects of my invention are attained in accordance with an exemplary embodiment comprising a key controlled switching system, having a crossbar switch field as the network media, for interconnecting stations and for connecting stations to communication channels terminating in the external telephone network (e.g. trunks to the Local Central Office). On the crossbar switch field the stations are terminated on the verticals while the horizontals provide access links between stations and also access links to the aforesaid trunks.

An attendant console position comprising a plurality of nonlocking keys is associated with a controller circuit responsive to attendant key operation for controlling connections through the crossbar switch field. By key selection at the console, a plurality of stations may be interconnected in conference with respect to each other and then by further key operation the stations may be connected to a remote station via one of the aforesaid trunks. When transfer of the conference to another trunk is required, the attendant reselects the originally selected trunk by key operation and thereafter simultaneously enables a key associated with the newly selected trunk and a group transfer key. The station conferees are thereupon automatically disconnected from the prior trunk and reconnected to the newly selected trunk.

During the interval between connection to the original trunk and the reconnection to the subsequent trunk, relays in the controller circuit operate to provide the required memory so as to insure that only the involved stations are reconnected. Thus, by selective enabling of a single additional transfer key, all associated stations are transferred en masse to the newly selected trunk.

In accordance with one feature of my invention, a switching system is arranged to respond to the enabling of a pair of nonlocking keys to cause the en masse transfer of a group of lines from one trunk to any other arbitrarily selected trunk.

In accordance with another feature of my invention, a key controlled switching system is provided with control circuitry including a memory operative to cause disconnection of a plurality of lines, recording of the particular lines disconnected and reconnection of the aforesaid lines in response to the selective enabling of a nonlocking key.

These and other features of my invention will be more apparent from a consideration of the subsequent description and drawing, in which:

FIG. 1 is essentially a block diagram showing the interrelation of the components of the exemplary embodiment;

FIGS. 2A, 2B, 2C and 3 through 26 show in greater detail some of the components of the exemplary embodiment.

Figure 2A:
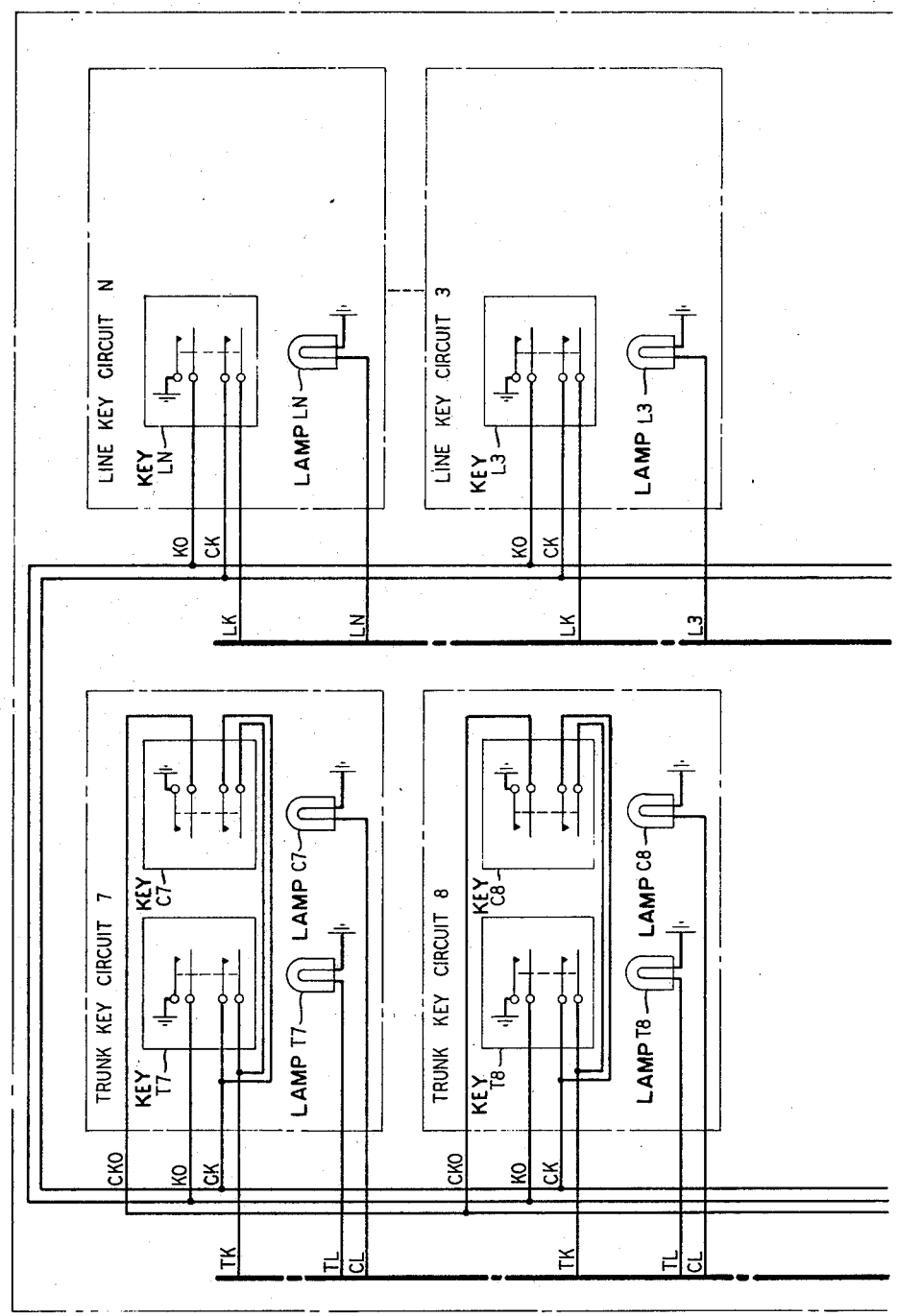

It will be noted that FIGS. 2A, 2B, 2C and 3 through 26 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, volume 74, pages 505–513.

GENERAL DESCRIPTION

1.01 Local conference connection

The interrelation and function of equipment units of the exemplary embodiment will now be described with reference to FIG. 1. A plurality of stations designated S1 through SN is shown connected via respective line circuits 10 through 15, and 19 to crossbar switch field 4. In similar fashion trunk circuits 7 and 8, local conference circuit 9 and local link 12 are connected to crossbar switch field 4. As will be more apparent from the detailed description, crossbar switch field 4 is the network media for interconnecting a plurality of the aforesaid stations with each other via local conference circuit 9 or local link 12, and for connecting a single station (or group of stations) to a trunk circuit such as trunk circuit 7 or 8. Controller circuit 5 is interposed between console position circuit 6 and crossbar switch field 4. As will be more apparent from that which is contained hereinafter, controller circuit 5 responds to nonlocking key operation at the console position to cause the completion of communication paths through the crossbar switch field.

Proceeding now with the description, we shall assume that station S1 has initiated a calling connection to console position circuit 6. As will be more apparent from that which is contained hereinafter, a connection is established from station S1 to local link 12 upon the enabling of the L1 nonlocking line key at console position circuit 6. At this point the attendant at the console position and the party at station S1 are interconnected by a voice communications path extending through local link 12.

We shall further assume that the subscriber at station S1 requests an initial conference connection involving only stations S2 and S3 and a subsequent conference connection involving stations S1, S2, S3 and another station (not shown) accessible only via the external telephone network. Upon the enabling of nonlocking keys L2 and L3, stations S2, S3 are connected through to each other to station S1 and to console position circuit 6 via local link 12.

At this point we shall assume that the particular remote station which is to be added to the connection is accessible via trunk circuit 7. Accordingly, the attendant at console position 6 momentarily depresses nonlocking key T7, thereby selecting trunk circuit 7. Upon receipt of dial tone, the attendant dials the called station directory number in the conventional fashion.

Upon answer by the called station, the attendant informs the called party of the conference connection. A line key associated with any of the conferee stations S1, S2, or S3 is then enabled to cause reconnection of console position circuit 6 with local link circuit 12. Upon reconnection, the attendant momentarily depresses conference key C7 associated with trunk circuit 7. The conferee stations are thereupon released from local link circuit 12 and are connected through to trunk circuit 7. The attendant is then available to serve other calls as hereinbefore set forth.

1.02 Transfer of conference group from trunk circuit 7 to trunk circuit 8

We shall assume at this point that an incoming call via trunk circuit 8 has been completed to console position 6 and further that it is necessary for the conference group comprising stations S1, S2 and S3 to be transferred en masse to trunk circuit 8 so as to place the aforesaid conference group in communication with a calling station other than the station to which the group is presently connected via trunk circuit 7.

In order to accomplish the desired transfer, the attendant merely depresses nonlocking key T7, thereby reselecting trunk circuit 7. Upon advising the parties of the pending transfer, the attendant simultaneously depresses key C8 and the group TRSFR key at console position 6.

As will be more apparent from the detailed description, as the result of the simultaneous depression of the aforesaid nonlocking keys, the existing network connection of the conferee stations is released and a new network connection is established between the conferee station and trunk circuit 8. Trunk circuit 7 is thereupon released so as to be available to serve other calls.

As will also be more apparent from the detailed description contained hereinafter, the aforedescribed en masse transfer of the conferee stations from one trunk circuit to another trunk circuit may be accomplished as frequently and as arbitrarily as circumstances may dictate.

2.01 Circuit arrangement of local conference circuit 9, local link 12 and conference bridges associated with trunk circuits It is believed that a more thorough understanding of the detailed circuit operation of the embodiment will be facilitated by a prior description of the functioning of local conference circuit 9, local link circuit 12, and conference bridges 1417 and 1418.

Figure 14:
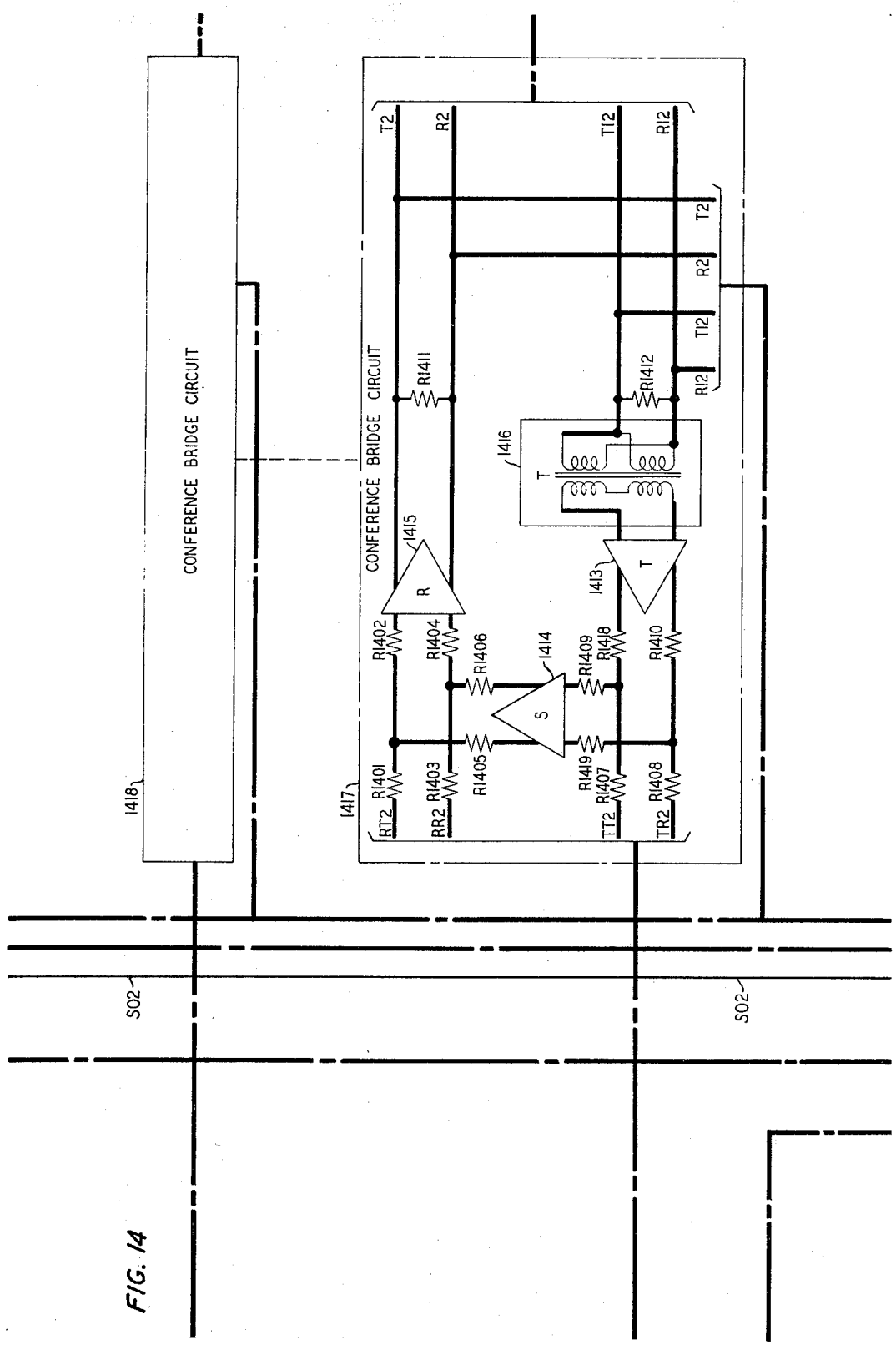

FIG. 14 shows the circuit arrangement of conference bridge circuits 1417 and 1418. Conference bridge circuit 1417 is connected via the T2, R2, T12, and R12 leads to crossbar switch B, horizontal level 3 and is connected via the RT2, RR2, TT2 and TR2 leads with trunk circuit 8. Conference bridge circuit 1418, which is associated with trunk circuit 7, is not shown in detail in order to simplify the drawings but is essentially identical in arrangement and apparatus to conference bridge circuit 1417.

Figure 15:
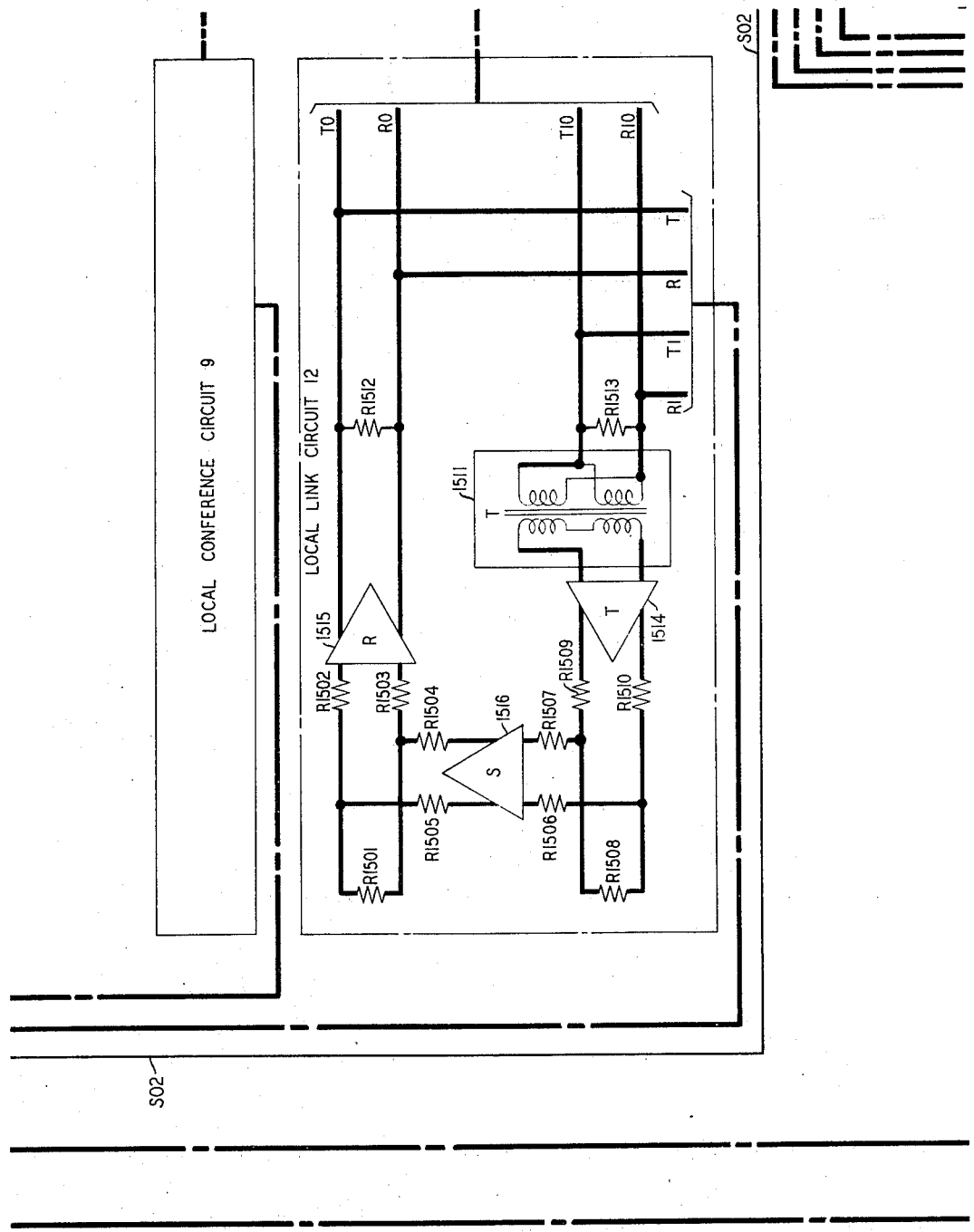

FIG. 15 shows in detail the circuit configuration of local link circuit 12 which is connected to horizontal level one of switch B in the crossbar switch field. Local conference circuit 9 is shown in block form in FIG. 15 to simplify the drawings and is essentially identical to local link circuit 12.

A comparison of conference bridge circuit 1417 and local link circuit 12 reveals that they are essentially identical with the exception that conference bridge circuit 1417 terminates in the associated trunk circuit 8 while local link circuit 12 is a termination in itself for connecting circuits. The following description will describe the intercooperaton of the elements of conference bridge circuit 1417 which, because of their similarity, will thus encompass a description of the intercooperation of the elements of local link circuit 12.

Conference bridge circuit 1417 includes a transmitting amplifier 1413, a receiving amplifier 1415, a side tone amplifier 1414, associated impedance matching resistances, load resistances, and a transmitting repeating coil 1416.

As shown in FIG. 14, the conference bridge circuit provides transmitting and receiving circuits for permanent connection to a trunk circuit such as trunk circuit 8 which, in turn, is associated with a crossbar switch horizontal level to which a multiplicity of matching line crcuits may be simultaneously connected.

Transmission on the T12 and R12 leads from line circuits connected through the associated crossbar switch horizontal level is through repeating coil 1416 and resistor 1412 which bridges the input side of the repeat coil. The output windings of repeat coil 1416 connects to the impedance matched transmitting input of amplifier 1413. The output of transmitter 1413 connects to the TT2 and TR2 leads of trunk circuit 8 through impedance matching resistors 1407, 1408, 1410 and 1418. The imput circuit of side tone amplifier 1413 connects to the output side of the impedance matching resistors 1410 and 1418 in parallel with trunk circuit 8. The output of side tone amplifier 1414 connects to the matched input of receive amplifier 1415 via the 1402, 1404, 1405 and 1406 impedance matching resistances. The output of the receive amplifier 1415 becomes the low impedance bus for transmitting toward the line circuits connected to the horizontal level in the crossbar switch field. Transmission from trunk circuit 8 is accomplished by the RT2 and RR2 leads through the 1401 and 1403 resistances which connect in parallel with the output of side tone amplifier 1414 to the input circuit of receive amplifier 1415.

It will thus be obvious from the foregoing that upon the connection of a plurality of matched line circuits to the input of conference bridge circuit 1417, conference communication may take place between such line circuits and any line circuit connected through to the other side of the conference bridge via trunk circuit 7.

2.02 Originating call from station S1 to console position 6

Figure 16:
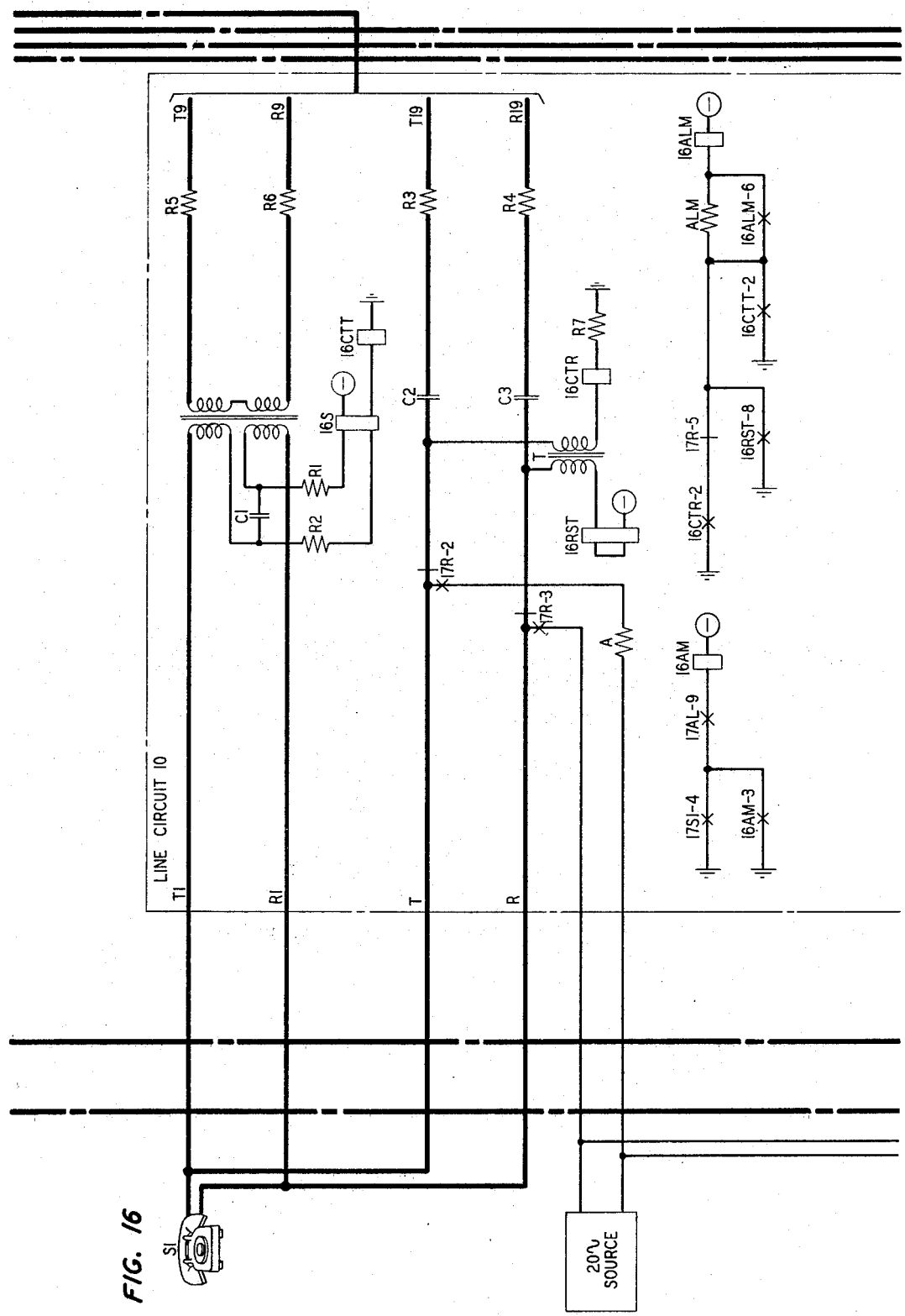

Referring now to FIG. 16, it will be observed that station S1 is associated with line circuit 10, which is, in turn, connected via leads T9, R9, T19 and R19 to the correspondingly designated leads of vertical unit nine of switch B (FIG. 26) in the crossbar switch field.

When the receiver is removed from the subset at station S1, switchhook contacts are closed in the well-known fashion thereby completing the obvious operate path of relay 16S in line circuit 10. The operation of relay 16S closes ground through enabled make contact 16S–6 to the start lead ST of signal generator circuit 1701. Relay 17S1 operates at this time by an obvious circuit path extending through enabled make contact 16S–4.

Figure 12:
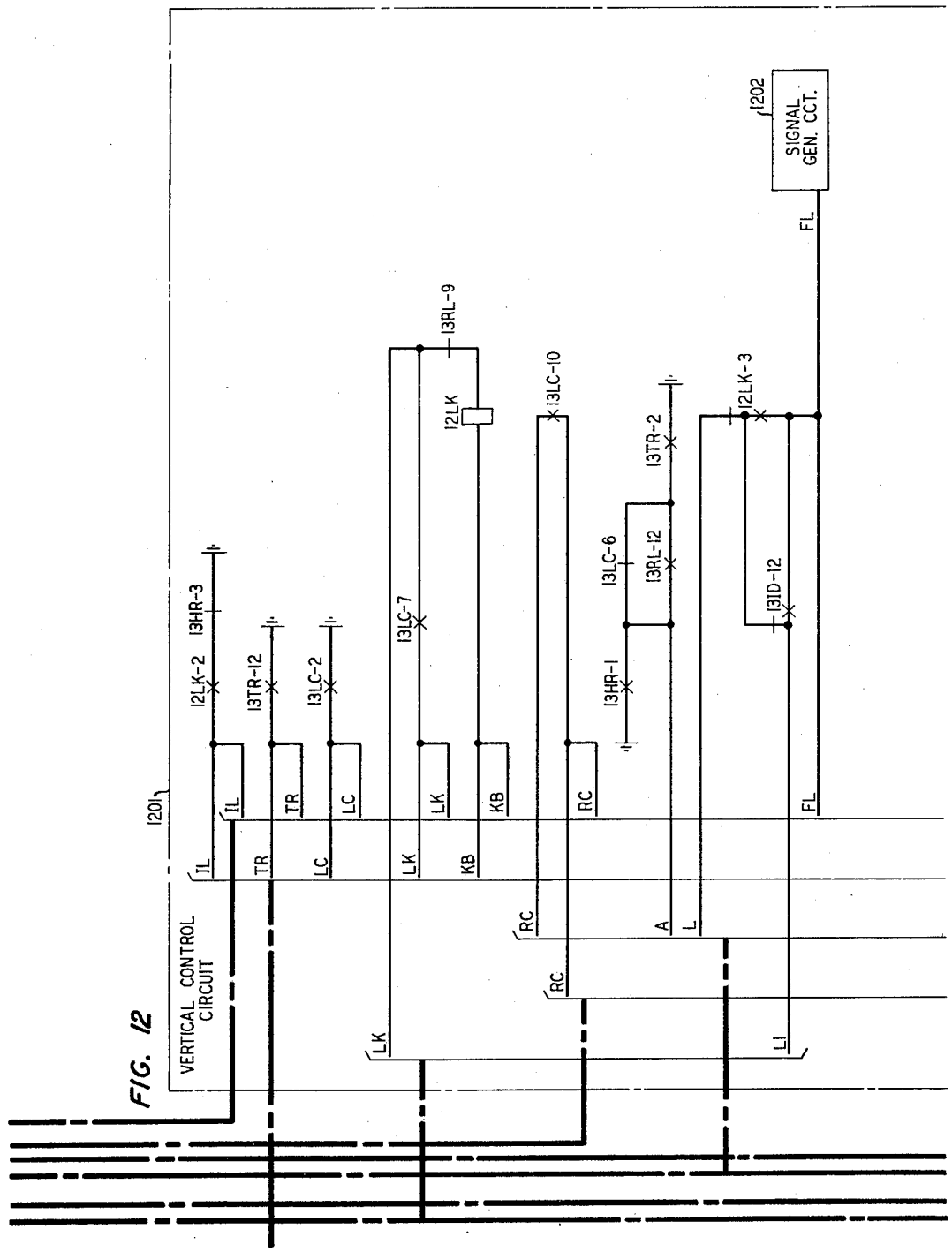

Flashing battery from signal generator circuit 1701 is extended via the FB lead through released break contact 17SM–6 and enabled make contact 17S1–10 to lead L, and then to the correspondingly designated lead of vertical control circuit 1201 at FIG. 12. This flashing battery signal on the L lead is thereupon extended through vertical control circuit 1201 via released break contact 12LK–3, released break contact 13ID–12 via the L1 lead to the correspondingly designated lead of line key circuit 1 in FIG. 2B. Lamp L1 thereupon lights in a flashing manner thus giving the attendant at console position 6 a visual indication of an incoming call from station S1.

Figure 2B:
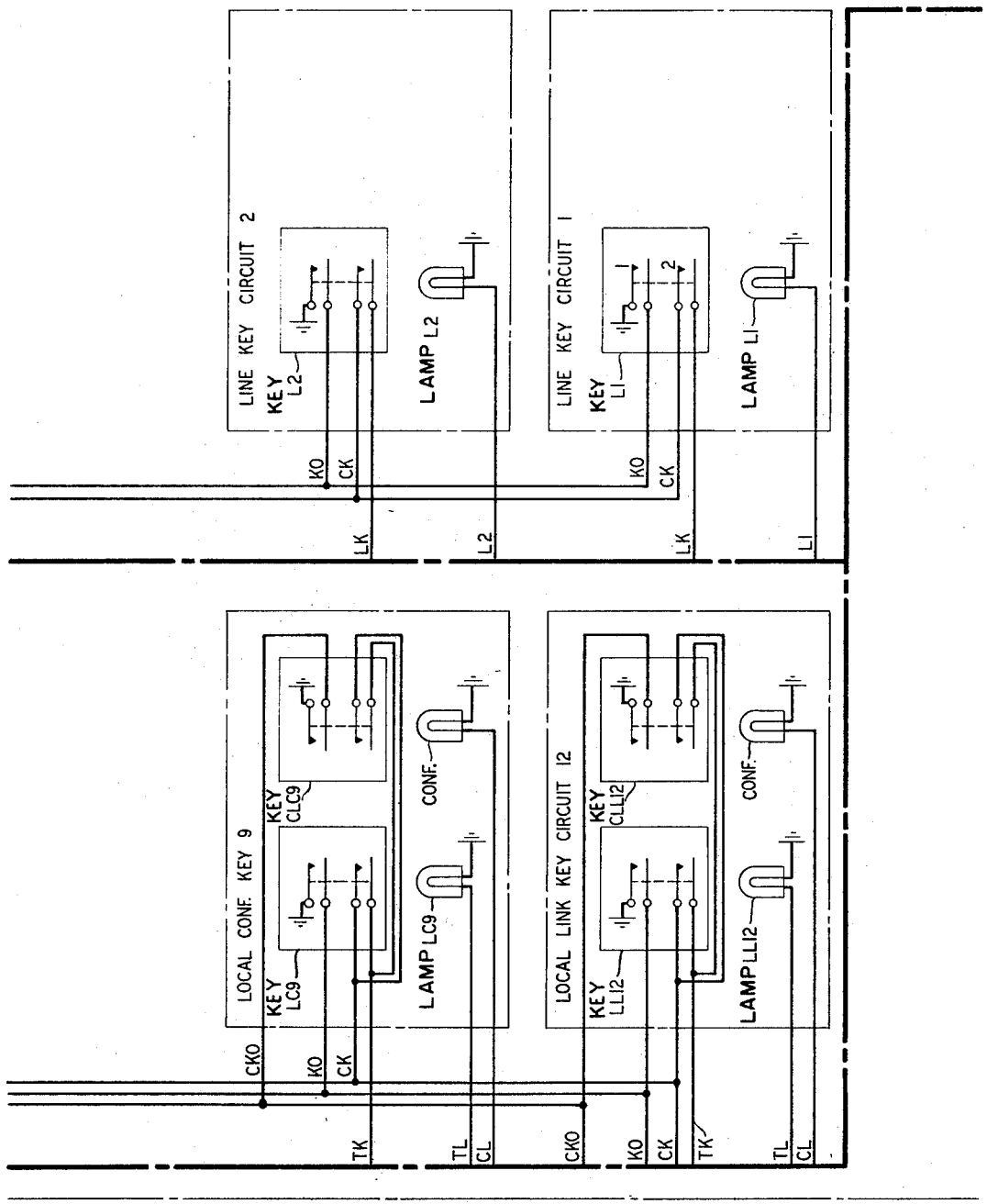
Figure 2C:
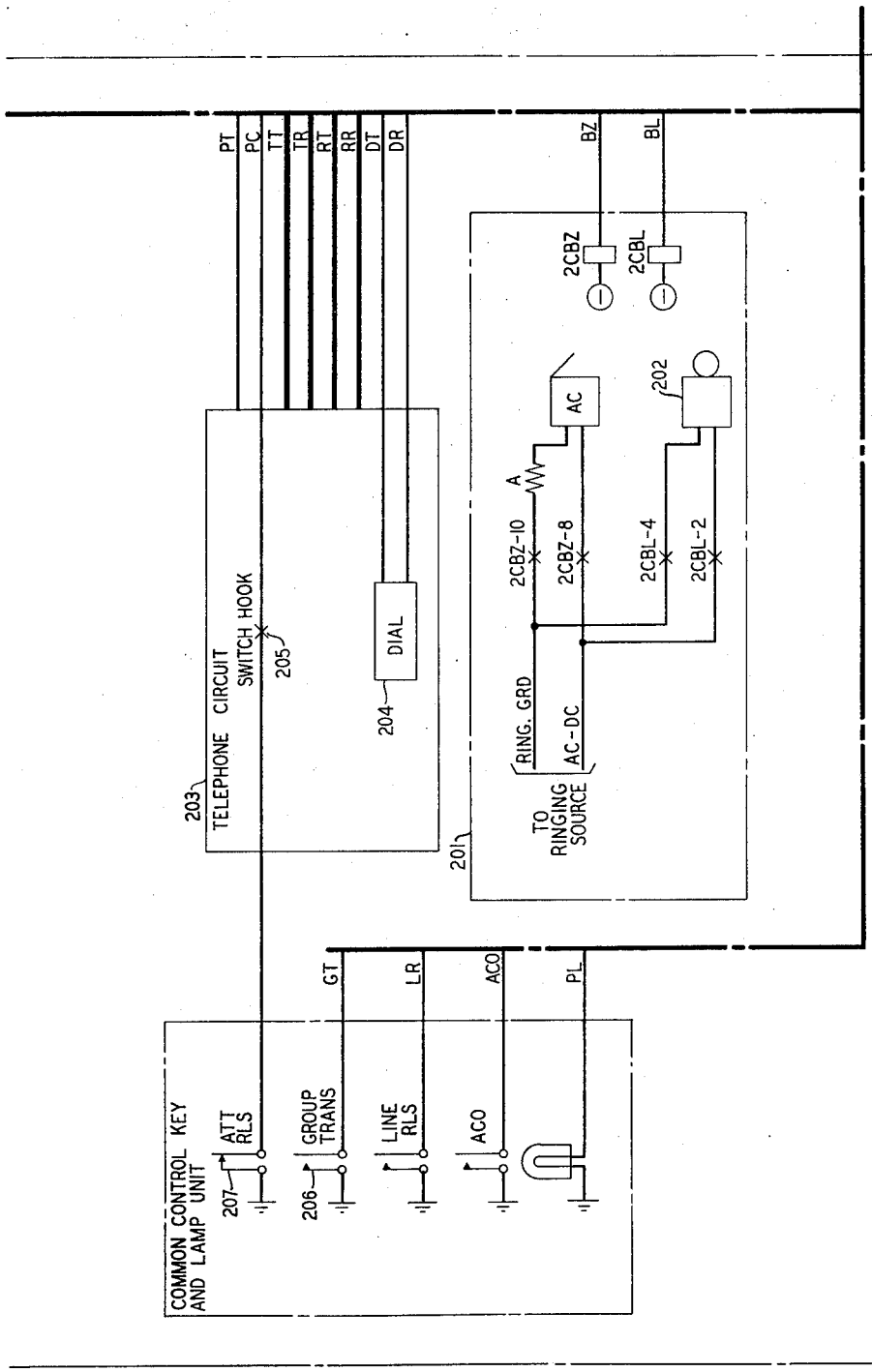
Figure 17:
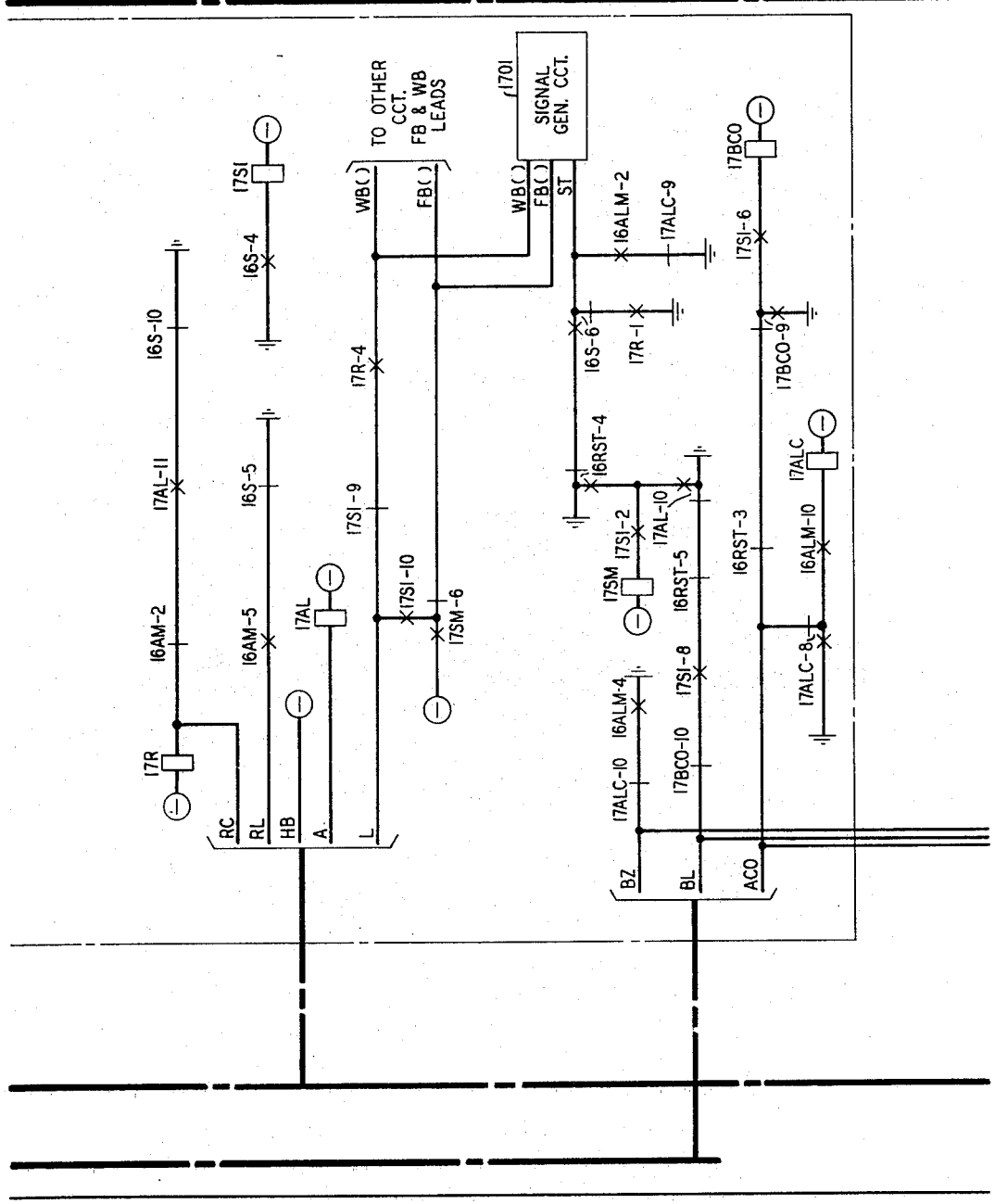

Referring now to FIG. 17, ground is also extended to the BL lead of line circuit 10 by an obvious circuit path including enabled make contact 17S1–8, to the correspondingly designated lead in FIG. 2C to audible signal circuit 201 to complete the obvious operate path of relay 2CBL. The enabled condition of make contact 2CBL–2 and 2CBL–4 enables ringer circuit 202 in the well-known manner thus also providing an audible indication of an incoming call.

If the attendant does not wish to answer the call immediately, he may silence the audible indication by operating the alarm cut-off ACO key (FIG. 2C). Enabling of the aforesaid key extends ground over the AC0 lead from console position circuit 6 so as to operate relay 17BCO in line circuit 10. The enabling of break contact 17BCO–10 interrupts the ground signal priorly provided on the BL lead as above described, thereby silencing the audible signal.

2.03 Answering the incoming call at console position 6

This section will describe the manner in which the attendant responds to the incoming call from station S1 as described in the immediately preceding section. In connection therewith it may be noted that all the keys and lamps shown on FIGS. 2A through 2C are located in console position circuit 6. Each line key, such as key L1 (FIG. 2B), has associated therewith an LK relay, such as relay 12LK. Each trunk key, such as trunk key T8 (FIG. 2A), has a trunk key relay TK, such as relay 10 TK, associated therewith. The KO and CK leads are common leads appearing at all such line keys and trunk keys in console position circuit 6. The line key and the trunk key relays have a common battery supply lead KB (FIG. 3) and a common locking ground lead KL (FIG. 4), which are under the control of the common control relays 3KO, 3KO1, 3KC and 5PC.

Proceeding now with the description; controller circuit 5 is activated by the attendant removing the handset from the switchhook at the console. The removal of the handset enables the switchhook in attendant telephone circuit 203 (FIG. 2C) in the well-known fashion thereby providing ground over the PC lead so as to operate relay 5PC. Relay 5PC operated enables make contact 8 of that relay which thereupon provides operating battery for relays 3KO, 3KC and 3KO1.

The aforedescribed flashing of lamp L1 (FIG. 2B) indicates to the attendant that station S1 desires to complete a connection through to the console circuit. Accordingly, the attendant momentarily depresses nonlocking key L1 which completes the operate path of relay 3KO. This operate path extends from negative battery through enabled make contact 5PC–8, the winding of relay 3KO, released break contacts 4D–5 and 4A–9, via the KO lead from FIG. 3 to the KO lead of FIG. 2B and then to ground on contact 1 of nonlocking key L1. The operation of relay 3KO: (a) releases any operated key relay by removing ground from lead KL of FIG. 4 via the enabling of break contact 3KO–10; (b) completes the operate path of relay 3KO1; (c) via enabled make contact 3KO–6 extends ground to the CK lead of FIG. 5 which extends to the correspondingly designated lead of FIG. 2B, through enabled make contact 2 on line key L1, via the LK lead of the line key circuit 1, to the correspondingly designated lead of verical control circuit 1201 (at FIG. 12) through released break contact 13RL–9, the winding of relay 12LK via the KB lead to the correspondingly designated lead of FIG. 4 where it is extended to battery through released break contacts 4SLO–8 and 3KO1–5, and enabled make contact 5PC–9.

Figure 4:
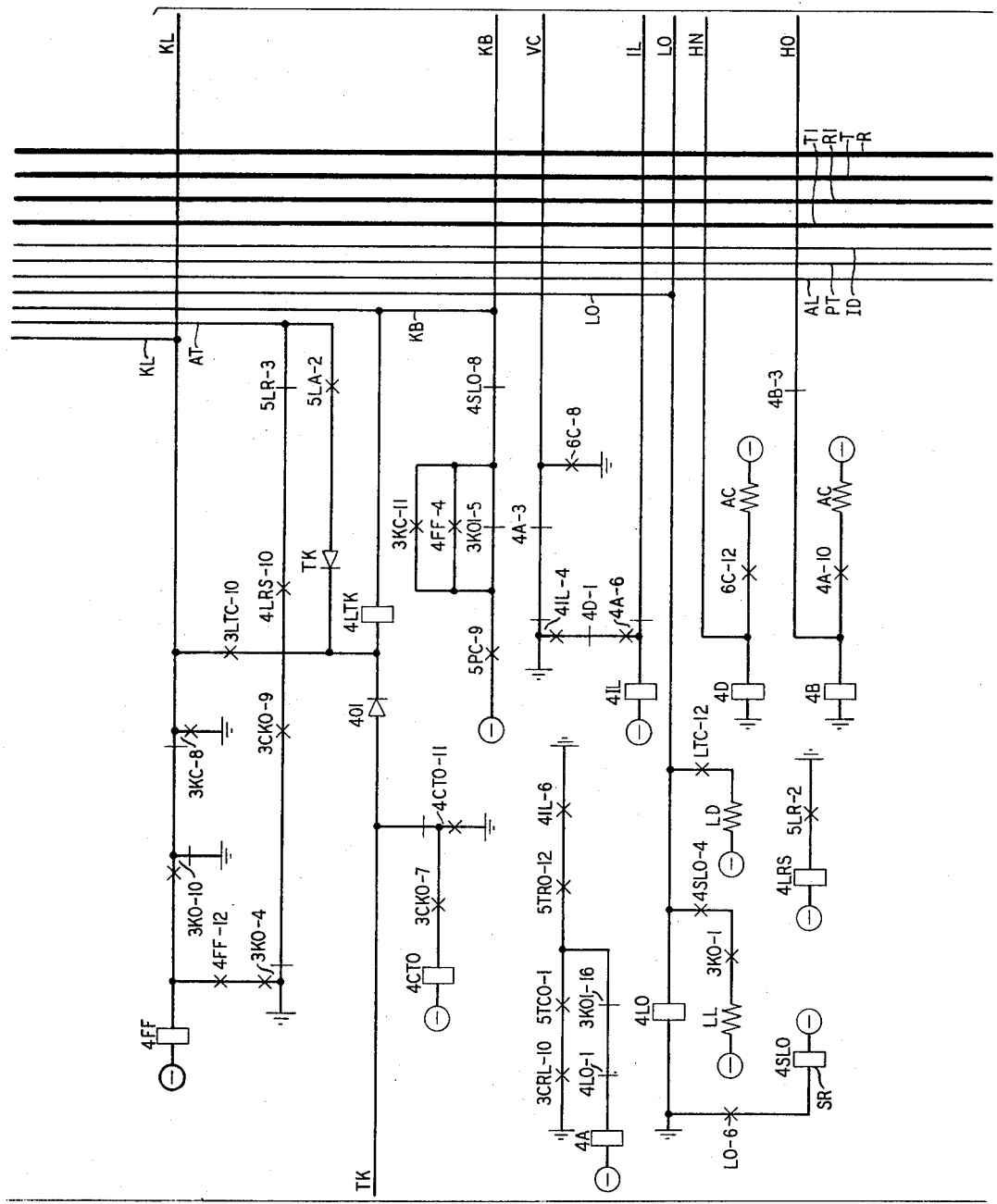

The operation of relay 3KO1 prepares the operating path for relay 3KC and removes battery from the lead KB of FIG. 4 via the enabled condition of break contact 3KO–5.

It may be noted at this point that the selected 12LK relay will not operate before the KB lead is opened as hereinbefore described because the LK relays are selected so as to have a sufficiently slow operate time to provide this characteristic.

Relay 3KC thereupon operates via a circuit extend'ng from negative battery through the enabled make contact 5PC–8, the winding of relay 3KC, enabled make contacts 3KO–1 and released break contacts 3TCO–4 and 5LCO–11 to ground. Relay 3KC thereupon locks operated by an obvious circuit extendirg through enabled make contacts 3KC–4. At this time the enabling of make contact 3KC–8 reconnects ground to the KL lead of FIG. 4. In s'milar fashion battery is extended to the KB lead of FIG. 4 via enabled make contact 3KC–11 thereby completing the aforedescribed operate path of relay 12LK.

The operation of relay 12LK: (a) comple'es the obvious operate path of relay 13LC; (b) transfers the L1 lead via enabled tranfer contact 12LK3 from its prior described connection to the L lead of FIG. 12 through the signal generator c'rcuit 1202 where a fluttering signal potential is provided in the well-known fashion to lamp L1 of line key circuit 1 in FIG. 2B; (c) extends ground by an obvious circuit including enabled make contact 12LK–2 to the IL lead of FIG. 12 which in turn, extends to the correspondingly designated lead of FIG. 4 so as to complete the operate path of relay 4IL.

Figure 5:
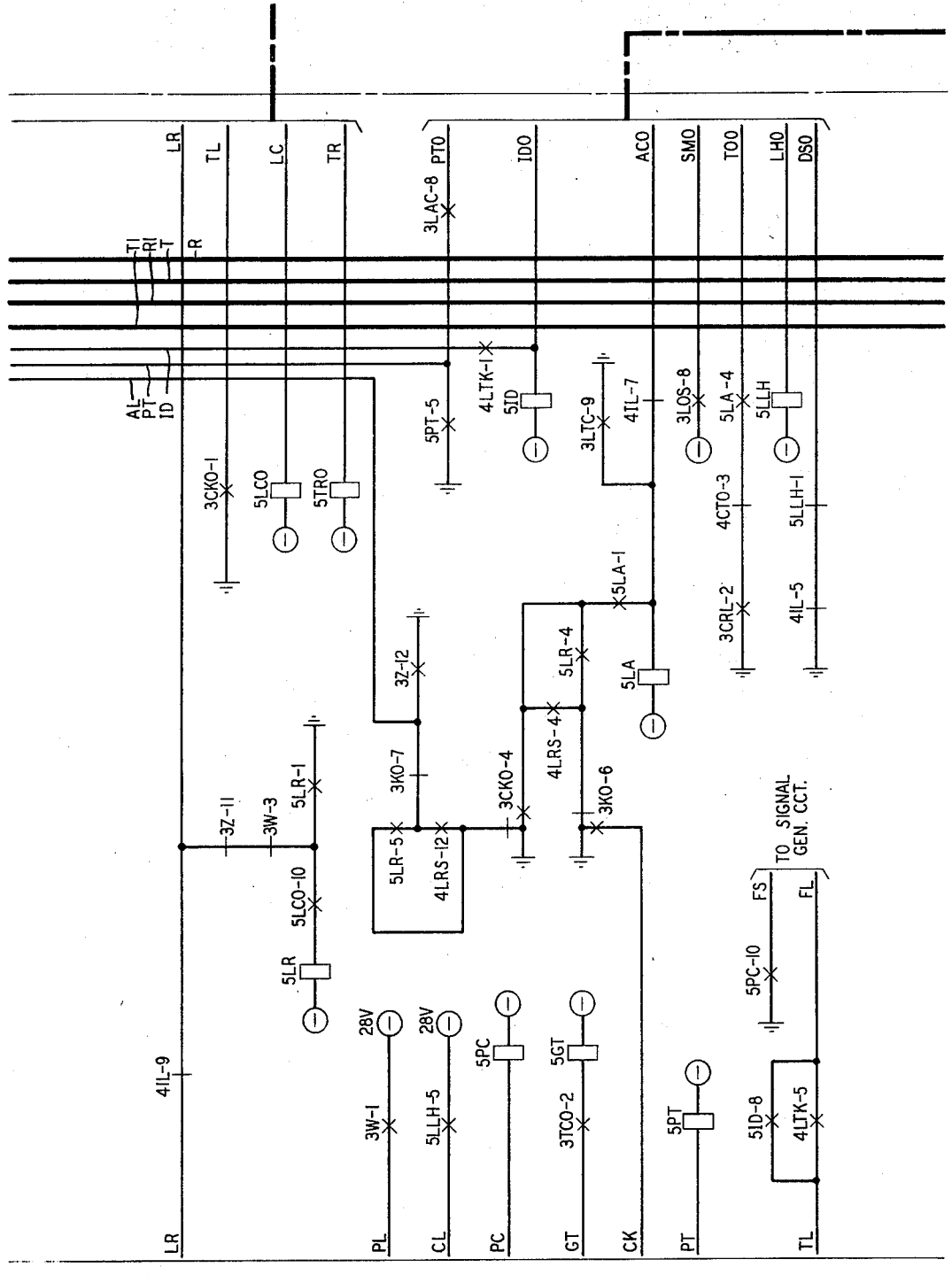

The operation of make contact 13LC-2 places ground on the LC lead of FIG. 12 which is extended to the correspondingly designated lead of FIG. 5 thereby operating relay 5LCO at this time. The enabling of make contact 13LC-1 places ground potential on the left side of relay 13TR which thereupon operates in parallel with the relay 13LC. Relay 5TRO operates at this time by a ground placed on the TR lead of FIG. 12 through enabled make contact 13TR-12.

The aforedescribed operation of relay 4IL enables break contact 4IL-3 thereby preventing the operation of relay 3CKO at this time in the event a conference key should be inadvertently operated. The enabling of break contact 4IK-4 removes ground from the VC lead of FIG. 4 thus preventing the operation of relay 13HR at this time.

All of the above functions, as set forth in this section, occur during the enabled condition of line key L1.

The release of line key L1 opens the aforedescribed operate path of relay 3KO via the removal of ground from the KO lead associated with contact 1 of line key K1. The release of relay 3KO removes the operate ground from the path of relay 3KO1 releasing that relay. In similar fashion the release of make cotact 3KO1-1 releases relay 3KC at this time. Relay 4A thereupon operates via a circuit path extending through release break contact 4LO-1, released break contact 3KO1-16 and enabled make contacts 5TRO-12 and 4IL-6 to ground.

Relay 12LK remains operated through a locking ground present on lead KL of FIG. 4 via released break contact 3KO-10 of that figure. The 3KO relay operating path remains disabled at this time because of the operated condition of brake contact 4A-9 thereby preventing interference if another line key or trunk key were to be operated.

Relay 4B also operates at this time via an obvious circuit path extending through enabled make contact 4A-10. The operation of break contact 4B-3 prevents the shunt release of relay 4B which would occur upon the operation of the hold magnets, as will be more apparent from that which is contained hereinafter. The enabled condition of make contact 4B-1 completes the obvious operate path of relay 6C. In similar fashion the enabling of make contact 4B-5 operates relay 3LOS at this time. The enabling of make contact 3LOS-8 (FIG. 5) extends battery over the SMO lead to the correspondingly designated lead of FIG. 20 which is multiplied to the correspondingly designated lead of FIG. 22 thereby operating select magnets 20SAO and 22SBO in parallel at this time.

As will be more apparent from that which is contained hereinafter, switch A (FIGS. 19, 20, 23 and 24) and switch B (FIGS. 21, 22, 25 and 26) are essentially operated in parallel with switch A closing through those leads necessary for control of the interconnected link and trunk circuits and switch B providing those leads necessary for the actual communication path. Thus, it will be obvious from the following description that, upon the enabling of a select magnet in each crossbar switch, followed by the enabling of respective hold magnets, a resulting circuit path exists between a line circuit and a bridge circuit comprising a total of ten conductors.

Proceeding now with the description: The enabling of select magnet 20SAO operates its associated make contact 1 thereby extending ground potential from the select magnet in FIG. 20 via the SO1 lead to the correspondingly designated lead in FIG. 6 so as to operate relay 6SO1 at this time. In similar fashion ground is extended on the SO2 lead from FIG. 22 so as to operate relay 6SO2 at this time. Relay 6C now operates because the enabling of break contacts 6SO1-1 and 6SO2-1 remove the shunting ground present on one side of the 6C relay winding. The enabling of make contact 6C-8 extends ground to the VC lead of FIG. 4 which is further extended to the correspondingly designated lead of FIG. 13 so as to operate relay 13HR at this time by an obvious circuit path. The enabled condition of make contact 13HR-1 extends ground via the A lead of FIG. 12 to the correspondingly designated lead of line circuit 10 (FIG. 17) thereby operating relay 17AL.

As will be more apparent from that which is contained hereinafter, the operation of relay 17AL causes the seizure of line circuit 10 by controller circuit 5.

Figure 13:
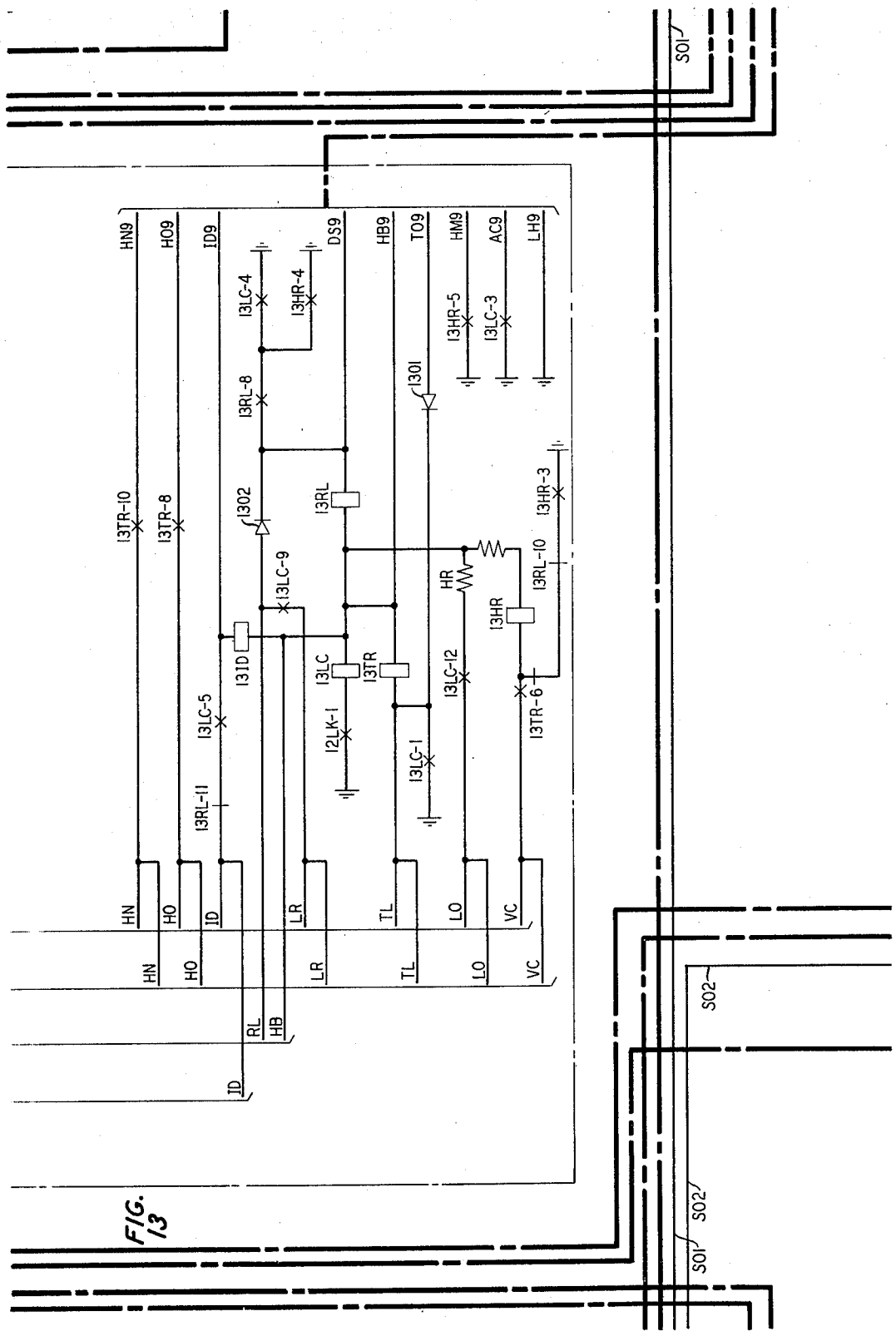
Figure 24:
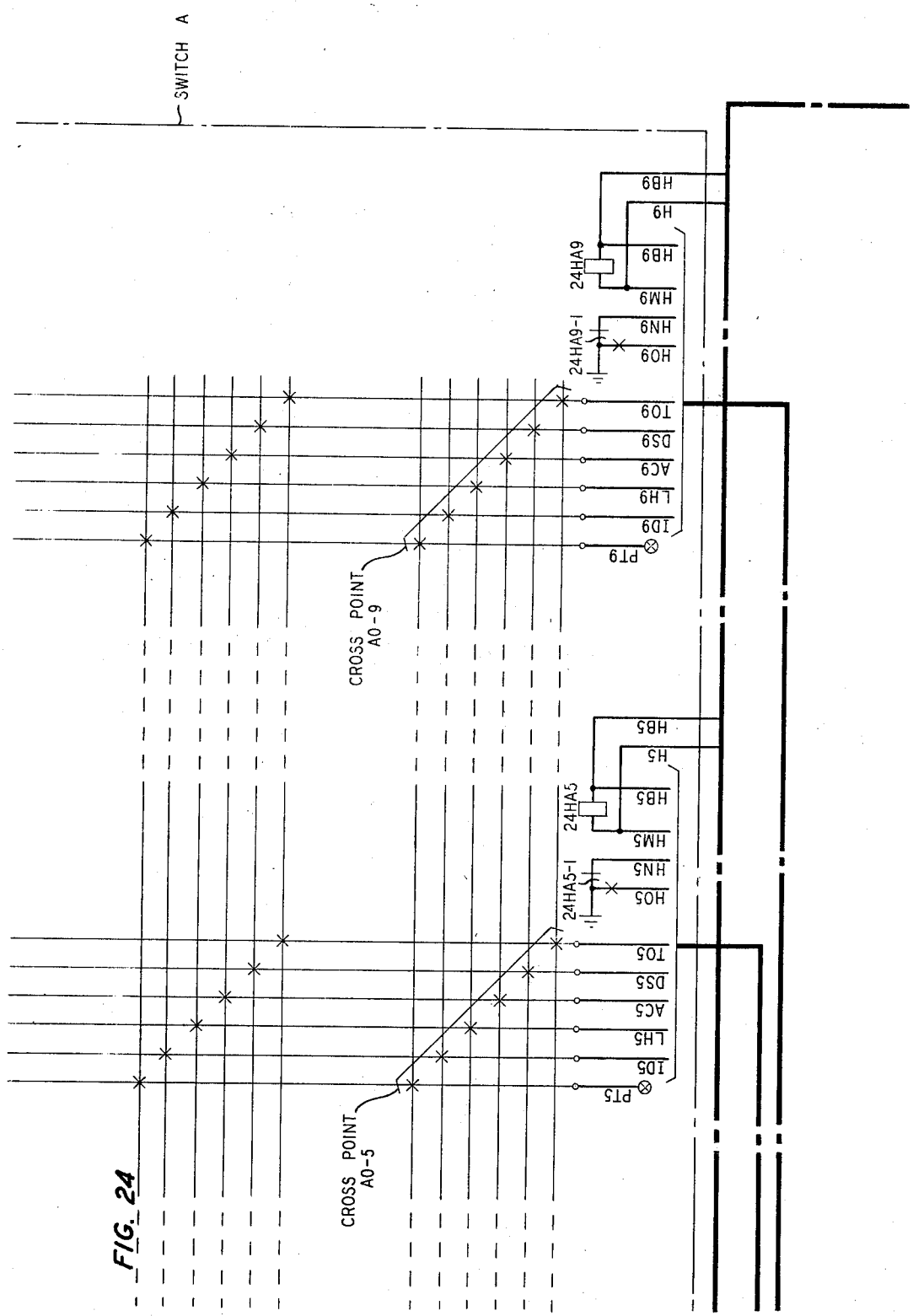
Figure 25:
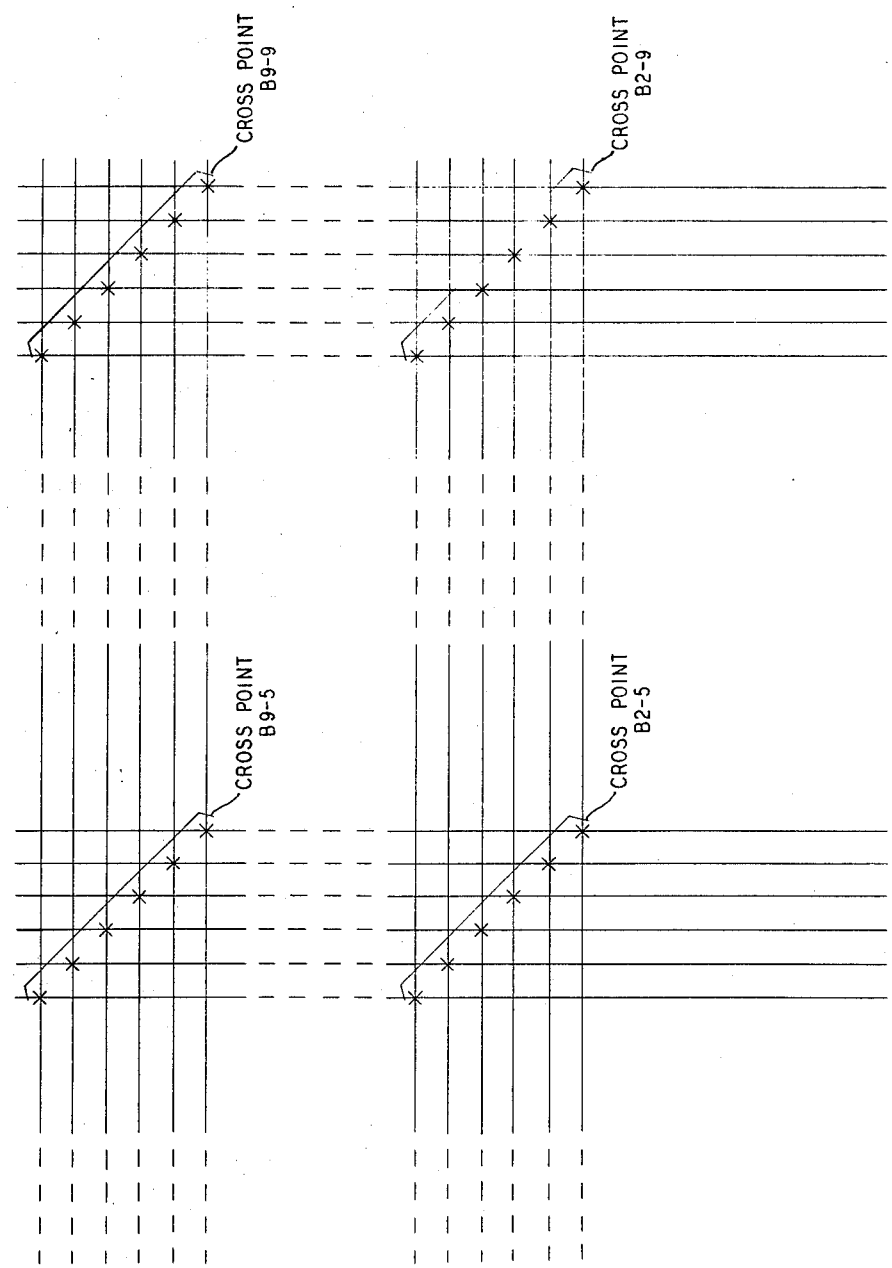
Figure 26:
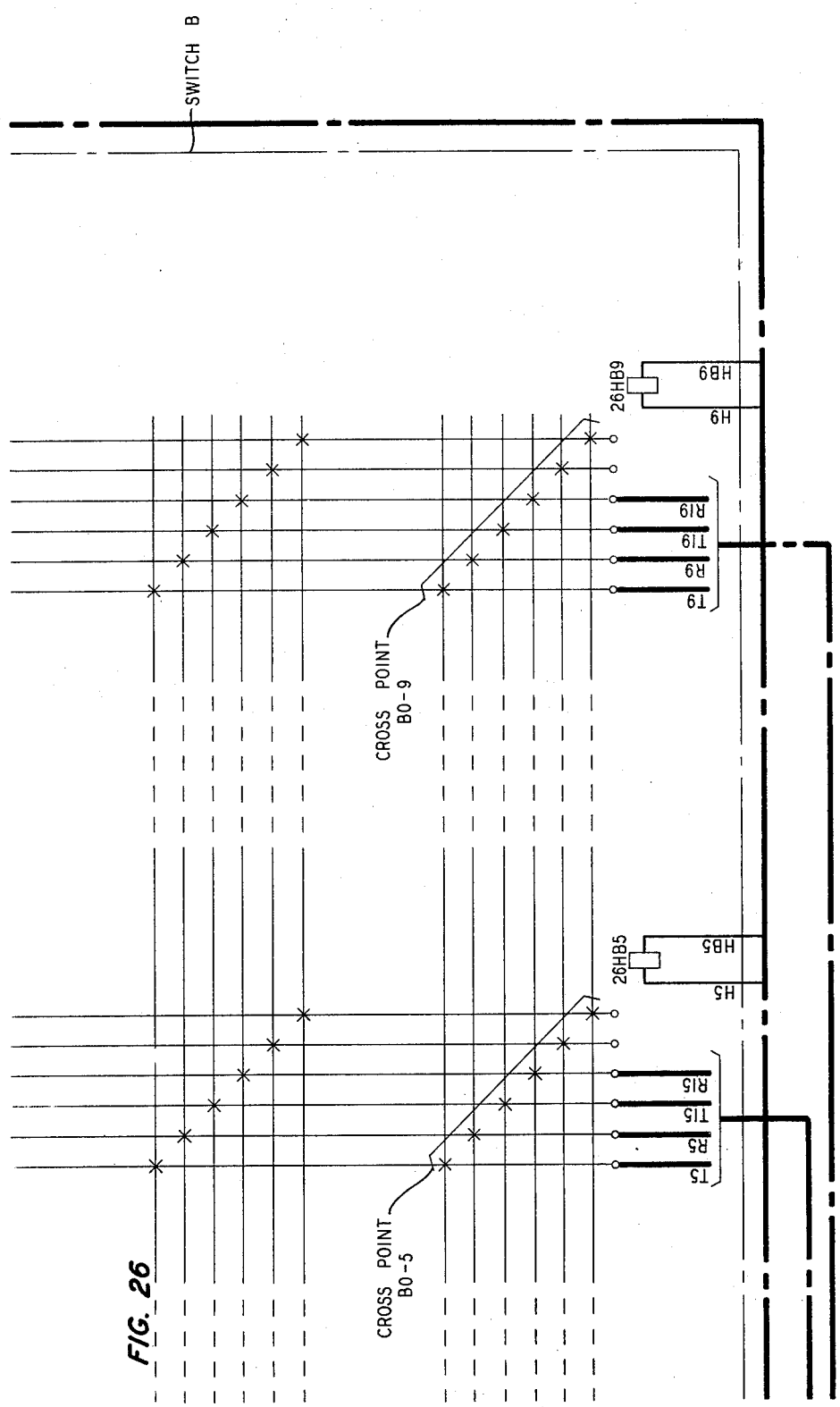
Figure 27:
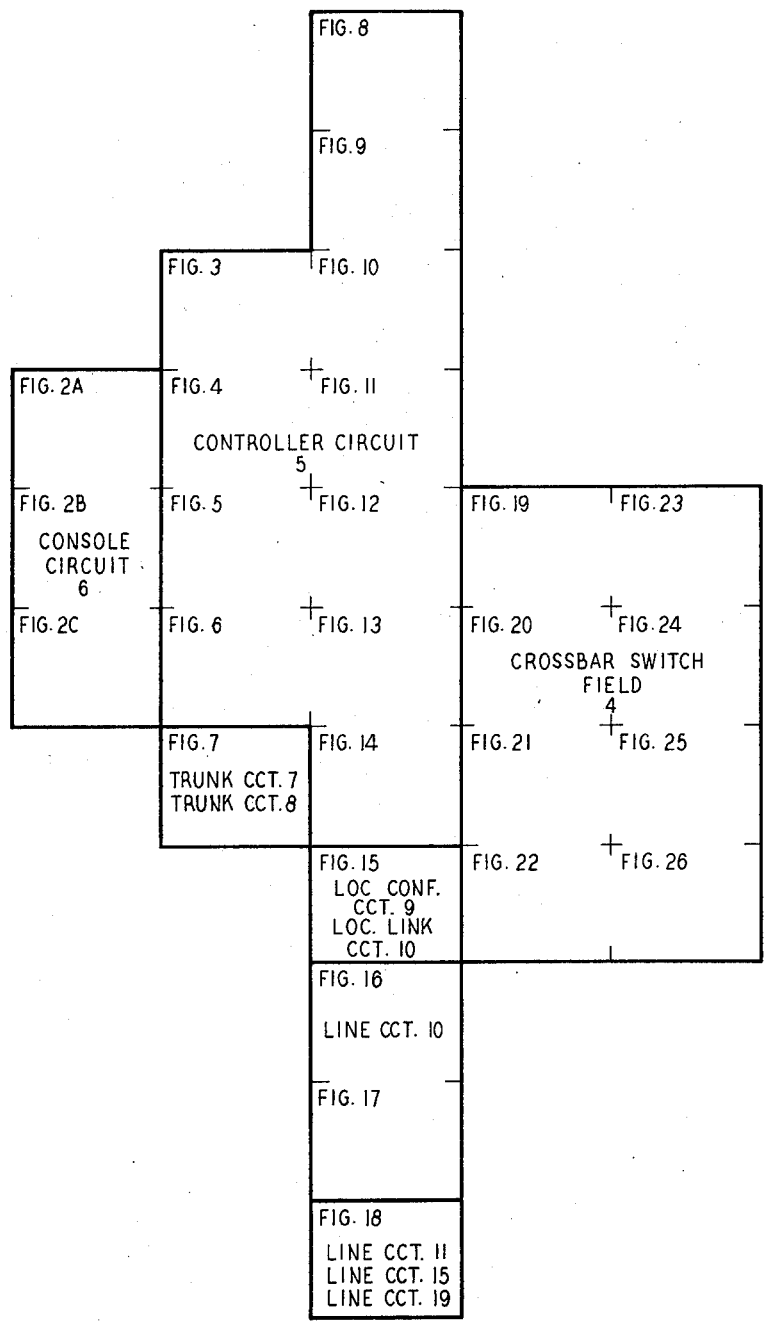
FIG. 27 shows in detail the manner in which the other figures should be arranged to facilitate a complete understanding of the invention.

Enabled make contacts 13HR-5 extend ground to the HM9 lead of FIG. 13 which is further extended to the correspondingly designated lead of FIG. 24, through the winding of the 24HA9 hold magnet, via the HB9 lead to the correspondingly designated lead of FIG. 13 which, as hereinbefore described, has battery potential thereon. The aforedescribed operating potential for the 24HA9 hold magnet is multipled to hold magnet 26HB9 to also cause the operation of hold magnet 26HB9 at this time.

Summarizing at this time, the operation of line key L1 has resulted in the enabling of select magnets 20SAO and 20SBO and the subsequent enabling of hold magnets 24HA9 and 26HB9 in crossbar switch field 4. Crossbar switch crosspoints A0-9 (FIG. 24) and B0-9 (FIG. 26) are thus enabled thereby interconnecting line circuit 10 with local link circuit 12 at this time.

Upon the closure of the aforesaid crosspoints, controller circuit 5 releases in the following manner. The enabling of transfer contact 24HA9-1 (FIG. 24) removes ground from lead HN9 which extends through the correspondingly designated lead of FIG. 13, via enabled make contact 13TR-10 to the HN lead of FIG. 4. Thus, shunting potential is removed from the right side of relay 4D, permitting tht relay to operate. The enabled condition of break contact 4D-1 opens the priorly described locking path of relay 4IL thereby releasing that relay at this time. In similar fashion the release of relay 4IL opens the operate path of relay 4A, releasing relay 4A. Relay 4B thereupon releases because of the released condition of the 4A-10 make contacts. The release of relay 3LOS caused by the normal conditon of make contacts 4B-5 thereupon opens the previously described operate path of select magnets 20SAO and 22SBO. As a result, relays 6SO1 and 6SO2 also release at this time. The release of relay 6C releases relay 4D. Thus, at this time all common control relays in controller circuit 5 have restored to normal.

Figure 6:
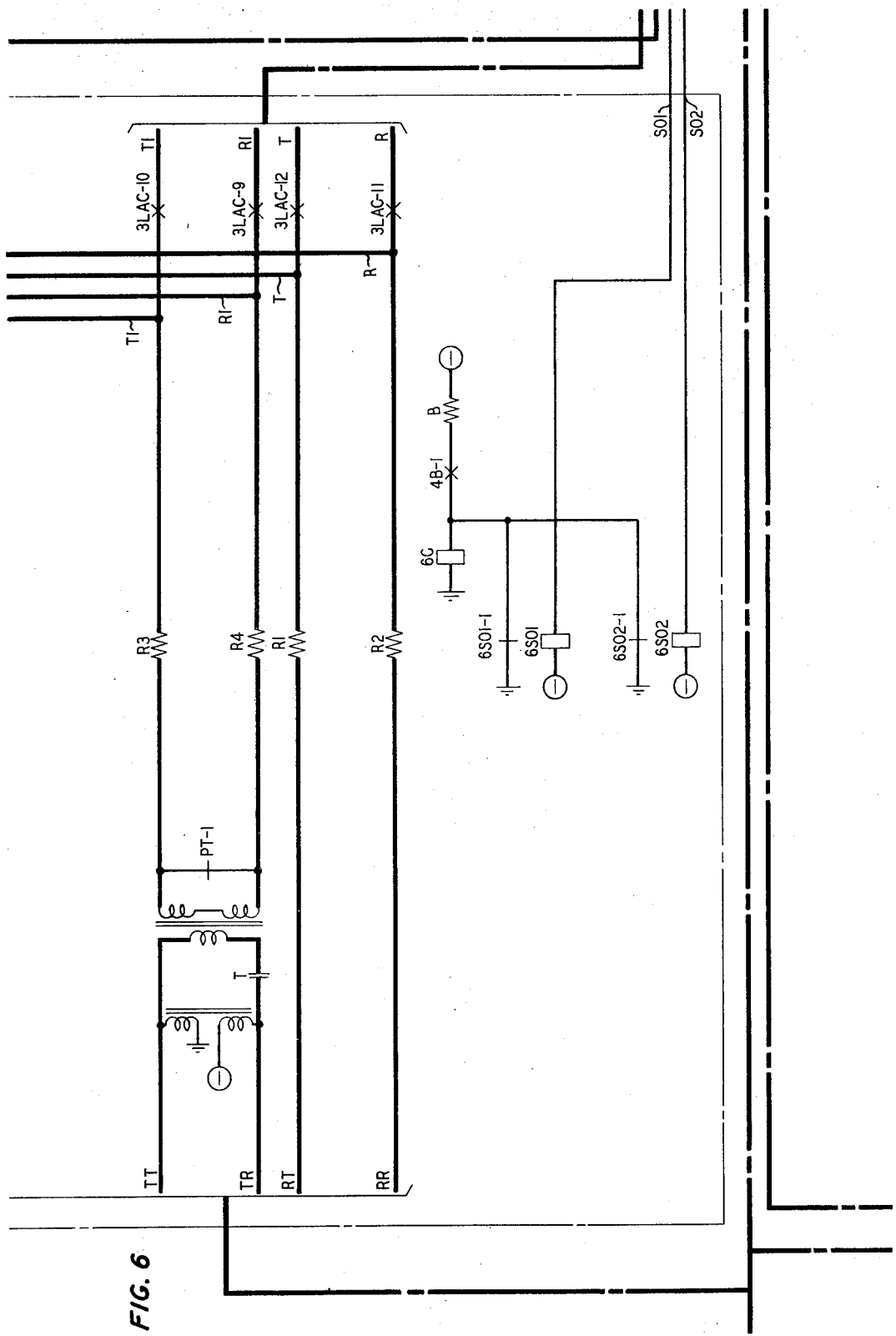

It will be noted that the attendant's telephone circuit 203 is extended via the transmission leads designated TT, TR, RT and RR from FIG. 2C to the correspondingly designated leads of FIG. 6. These transmission leads are thereupon extended through FIG. 6 via enabled make contacts 3LAC-10, 3LAC-9, 3LAC-12, and 3LAC-11 to the T1, R1, T, and R leads, respectively, which are, in turn, extended to the correspondingly designated leads of local link circuit 12 in FIG. 15. It will be obvious from the aforedescribed operation of local link circuit 12 that the attendant telephone circuit will be in communication with any line circuits connected to the T0, R0, T10 and R10 leads of local link circuit 12.

Figure 22:
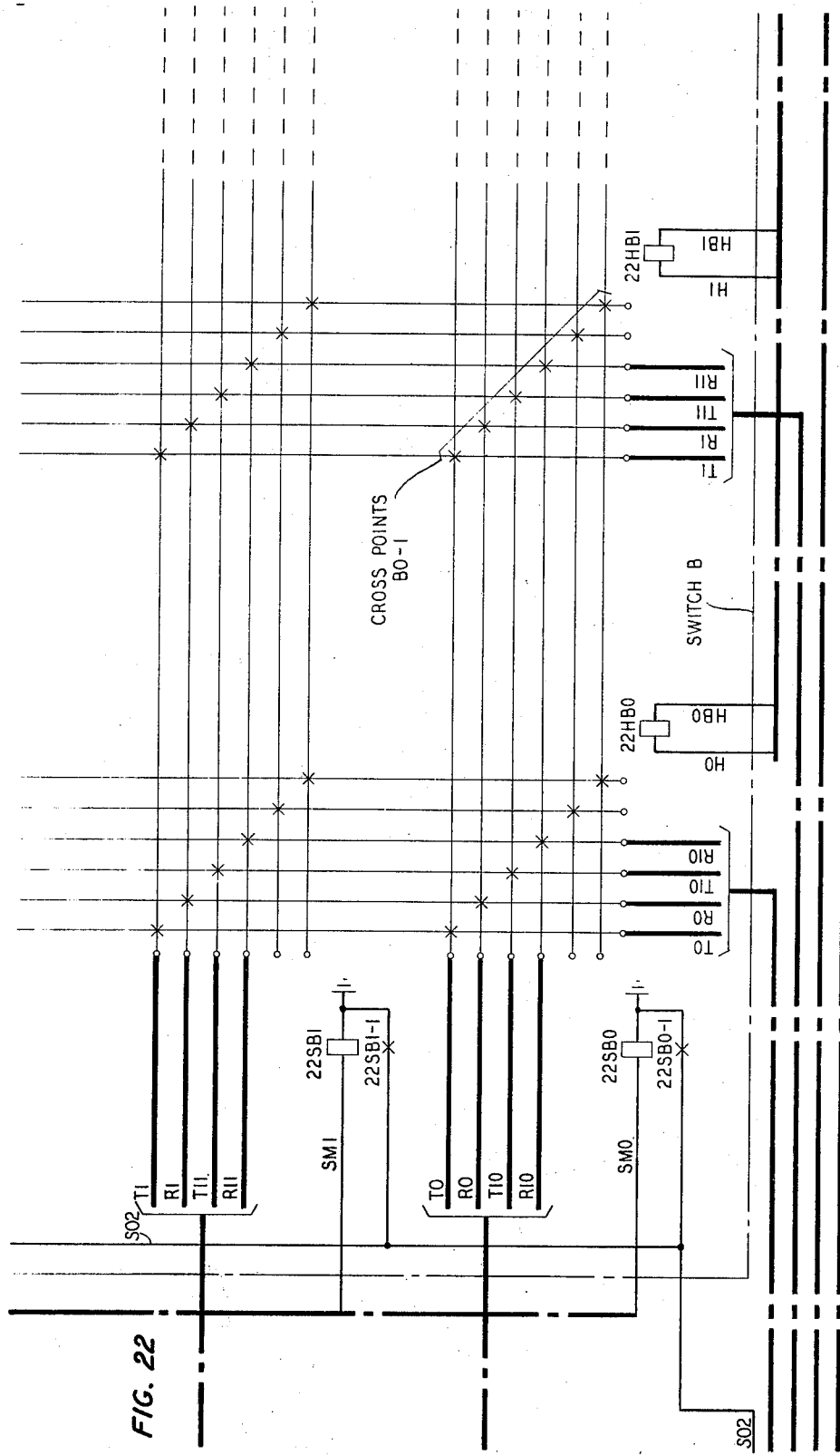
Figure 23:
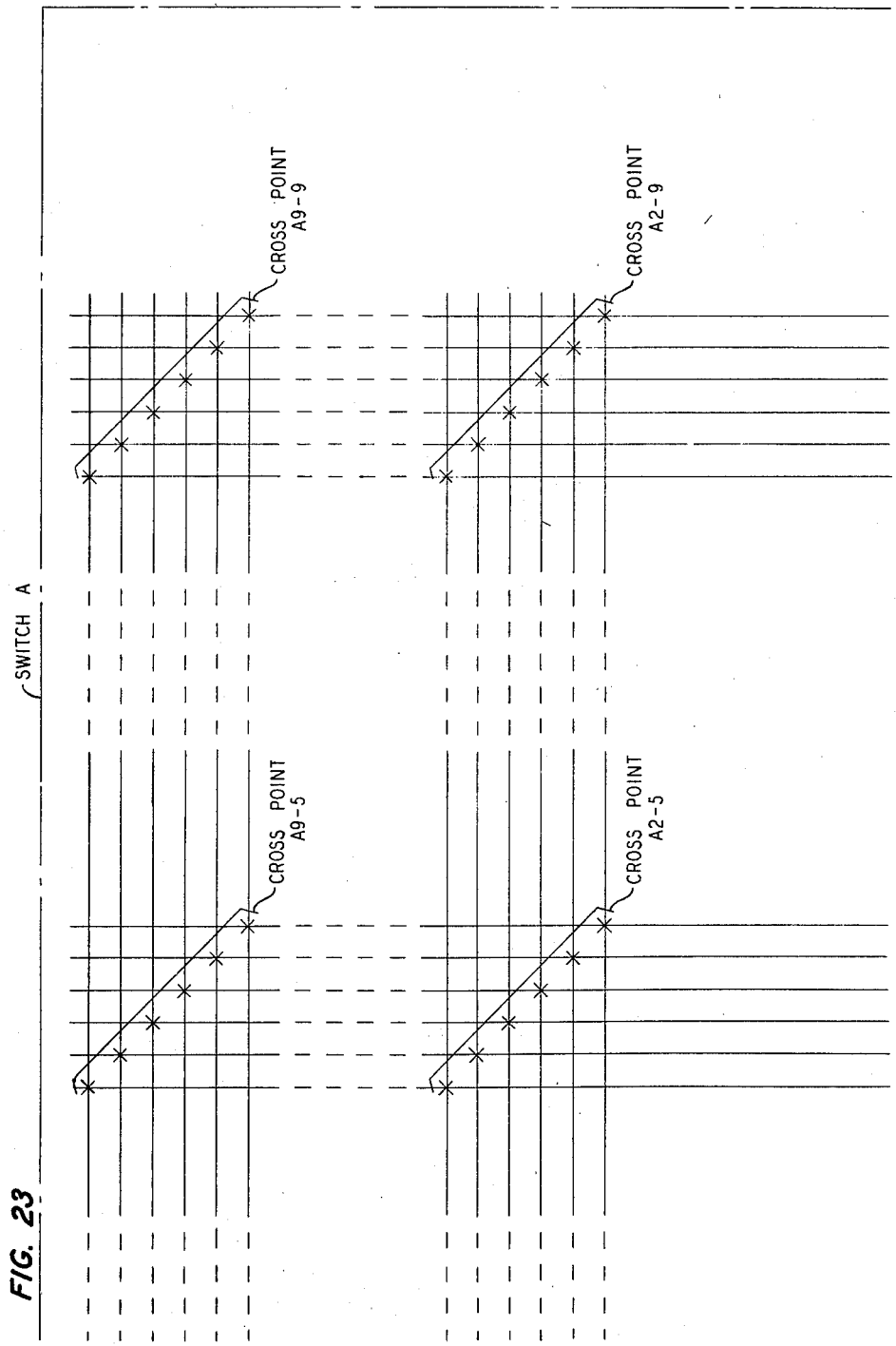

By virtue of enabled crosspoints B0-9 in the crossbar switch field, a communications path exists from station S1 of FIG. 16 through line circuit 10, via the T9, R9, T19, and R19 leads of line circuit 10 to the correspondingly designated leads of vertical unit 9 of the crossbar switch field at switch B, thence through crosspoints B0-9 via the horizontal multiple of switch B to the T0, R0, T10, and R10 leads of FIG. 22 which are connected through to the input of local link circuit 12 in FIG. 15. It will thus be obvious that a communications path presently exists between station S1 and the attendant at console position circuit 6.

For purposes which will be obvious from the detailed description contained hereinafter, crosspoints A0-9 in switch A of crossbar switch field 4 closes through various control leads which extend from vertical control circuit 1201 at FIG. 13, via vertical unit 9 of switch A, through crosspoints A0–9 to leads designated PT0, ID0, LH0, AC0, DS0, and TO0 in FIG. 20 and from that point to the correspondingly designated leads of controller circuit 5.

2.04 Selection of stations S2 and S3 by attendant console position 6

We shall assume at this point that the subscriber at station S1 has informed the attendant that he desires the interconnection in conference fashion of stations S1, S2, and S3. In this regard it may be noted that line circuit 11 and line circuit 15, which are shown on FIG. 18, have been shown in block form in order to simplify the drawing. However, although they may comprise any number of configurations well known in the art, we shall assume for purpose of the description that each of these line circuits comprise a circuit configuration idential to that which is shown for line circuit 10 on FIGS. 16 and 17.

At this time, in order to complete a connection from local link circuit 12 through to station S2 in response to the request of the subscriber at station S1, the attendant merely depresses line key L2 (FIG. 2B) in the same fashion as that hereinbefore described for the selection of station S1. Circuit operation proceeds identically as set forth hereinbefore for the selection of station S1 with the exception that line circuit 11 which is associated with station S2 appears on vertical unit 1 of switch B of the crossbar switch field at FIG. 22 as manifested by the T1, R1, T11, and R11 leads. At this point the crosspoints which will be enabled in order to interconnect line circuit 11 with local link circuit 12 comprise crosspoint B0–1 (FIG. 22).

Thus, select magnets 22SBO and 20SAO are reoperated as hereinbefore described upon the enabling of line key L2. However, the particular hold magnets, which are operated at this time are hold magnets 20HA1 and 22HB1 in order to close through the crosspoints associated with the second vertical in switches A and B of the crossbar switch field. Thus, upon the enabling of nonlocking key L2, FIG. 2B, circuit action proceeds, as hereinbefore described, with the noted exception that crosspoints B0–1 are enabled at this time thereby completing a circuit path from the transmission leads of local link circuit 12 in FIG. 15, through the lower horizontal level of switch B, through the aforesaid crosspoints to the corresponding transmission leads of line circuit 11 and thus through to station S2.

Figure 20:
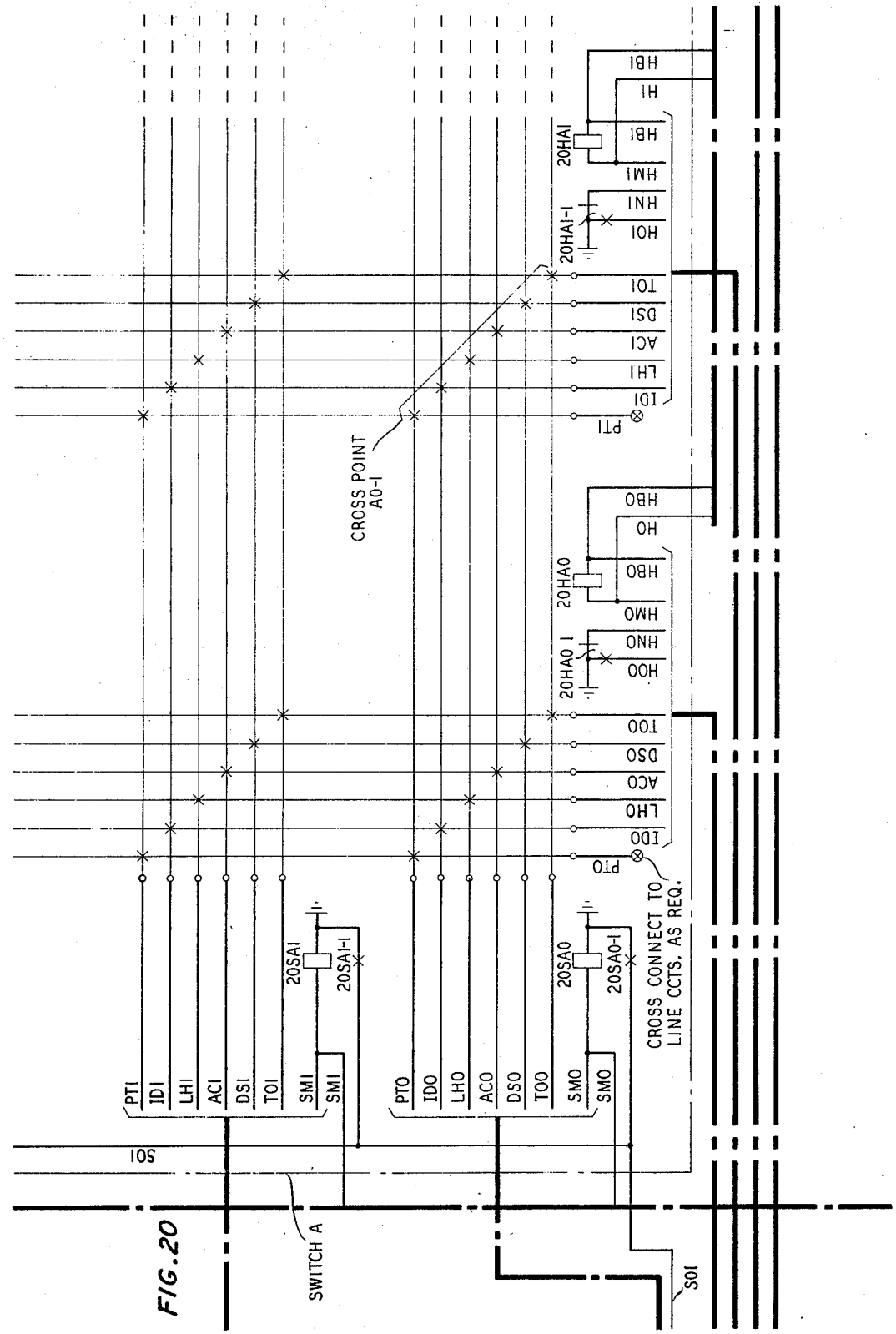

It will be noted that vertical control circuit 1102 is associated with the second vertical unit of crossbar switch A at FIG. 20. It will thus be obvious, in view of the prior detailed description for the functioning of vertical control circuit 1201, that vertical control circuit 1102 contains the necessary apparatus to enable the crossbar switch vertical unit associated with line circuit 11. However, the circuit details of line circuit 1102 are not shown in detail in order to simplify the drawings. Thus, in order to describe the present calling connection to station S2, reference will be made again to vertical control circuit 1201; it being understood, of course, that the described circuit action takes place, in fact, in vertical control circuit 1102.

Figure 18:
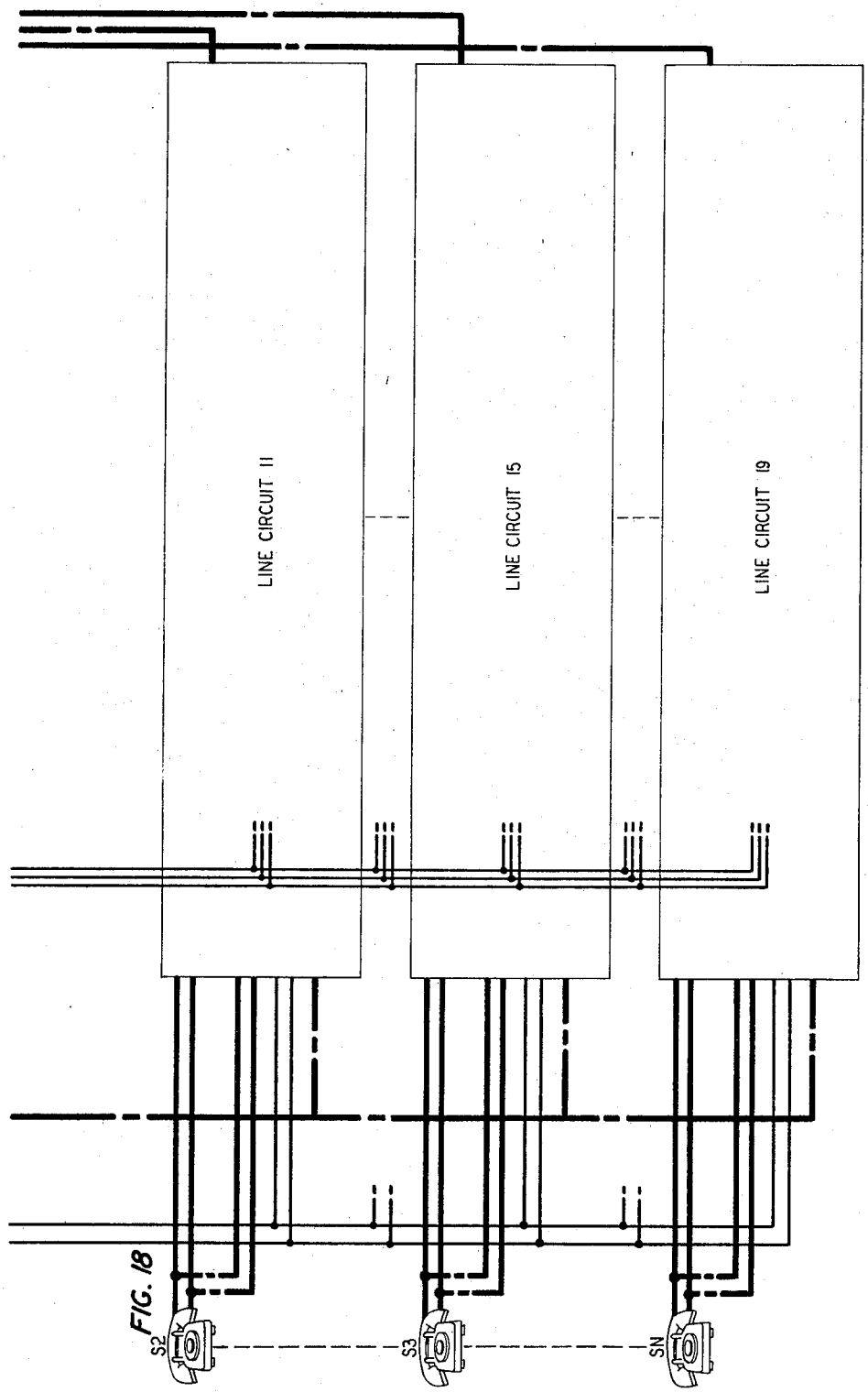

The aforedescribed operation of relay 13HR enables make contact 13HR–1, thereby placing ground potential on the A lead which is extended to the correspondingly designated lead of line circuit 11 in FIG. 18. The A lead for line circuit 11 is not shown in the drawing. However, circuit operation will now be described for line circuit 10 which, as hereinbefore set forth, applies equally as well to both line circuits. Thus, ground present on the A lead operates relay 17AL at this time. The consequent enabling of make contact 17AL–11 operates relay 17R in the line circuit. The subsequent enabling of transfer contacts 17R–2 and 17R–3 (FIG. 16) close through a source of 20 cycle signal which is thereupon impressed upon the T and R leads leading to the connected station. Thus, at this time, an audible signal is forwarded to station S2 to alert that station to the fact that an incoming call is directed thereto. Upon an off-hook condition of the subset being manifested at station S2, a complete communications path exists from that station through line circuit 11, via the crossbar switch field to local link circuit 12 as hereinbefore described. Thus, station S2 is placed in conference with station S1 and the attendant at the console position 6 at this time. Upon the enabling of nonlocking line key L3 (FIG. 2A), essentially the same circuit action takes place as hereinbefore described for stations S1 and S2. Thus, crosspoints B0–5 and A0–5 are enabled in crossbar switch field 5 at FIGS. 26 and 24, respectively, so as to place station S3 in conference with respect to stations S1, S2 and console position circuit 6 via local link circuit 12.

2.05 Conference connection involving stations S1, S2, S3 and another station via trunk circuit 7

We shall assume at this point that the attendant at console position circuit 6 has been advised that the conferees desire to be connected to another station which, for example, may be accessible only by a trunk circuit, such as trunk circuit 7, which leads to the external telephone network.

Figure 9:
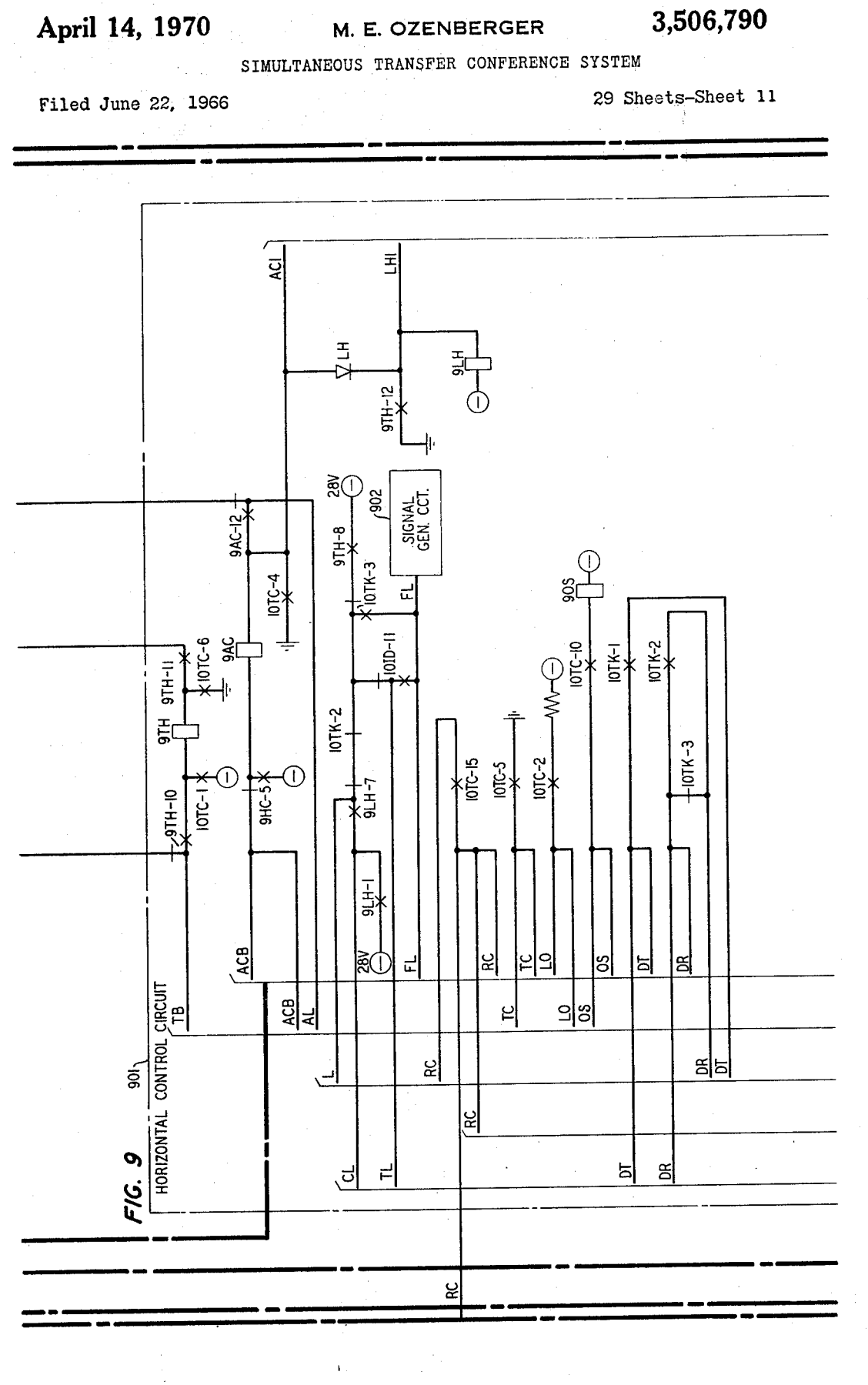
Figure 10:
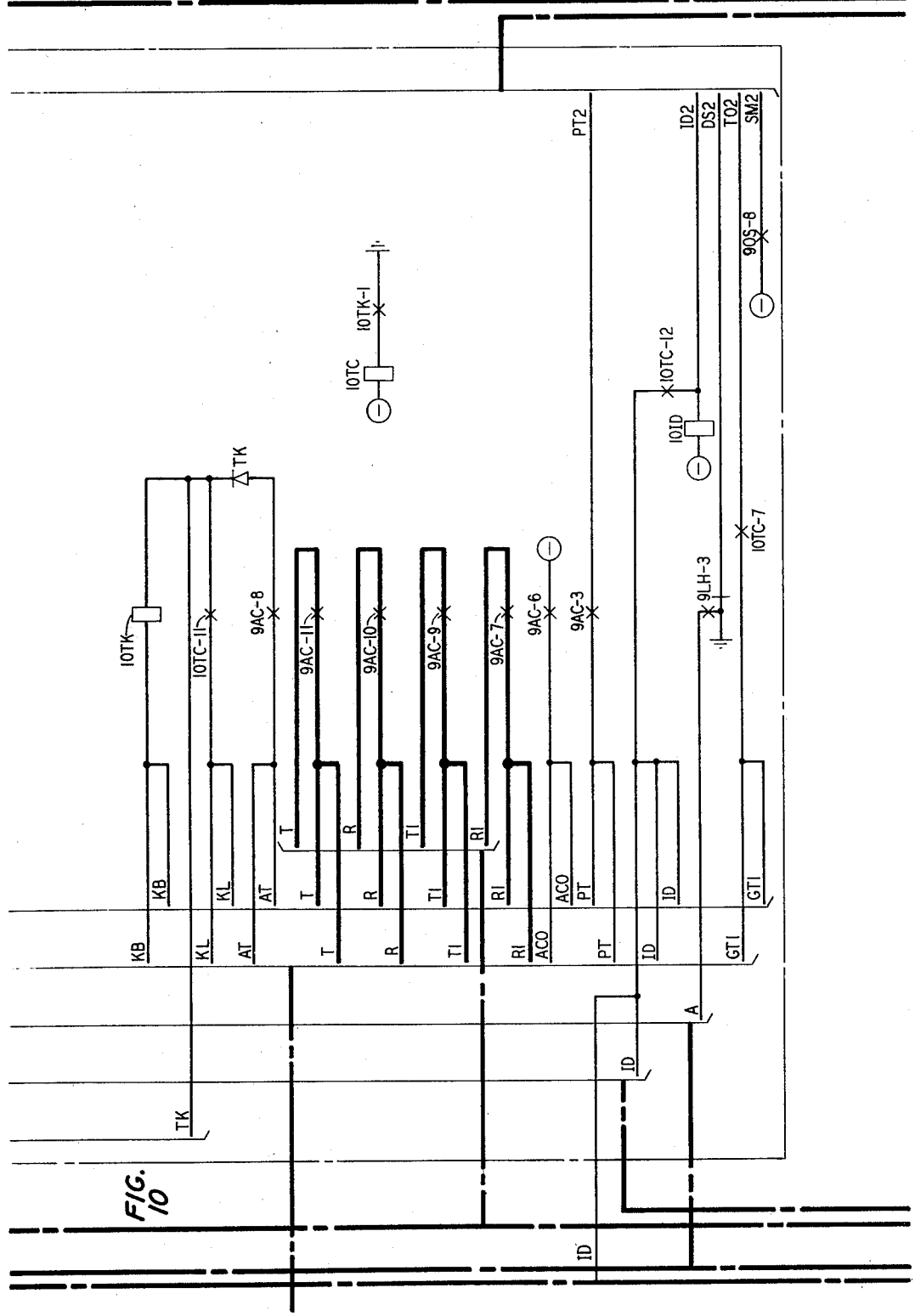
Figure 11:
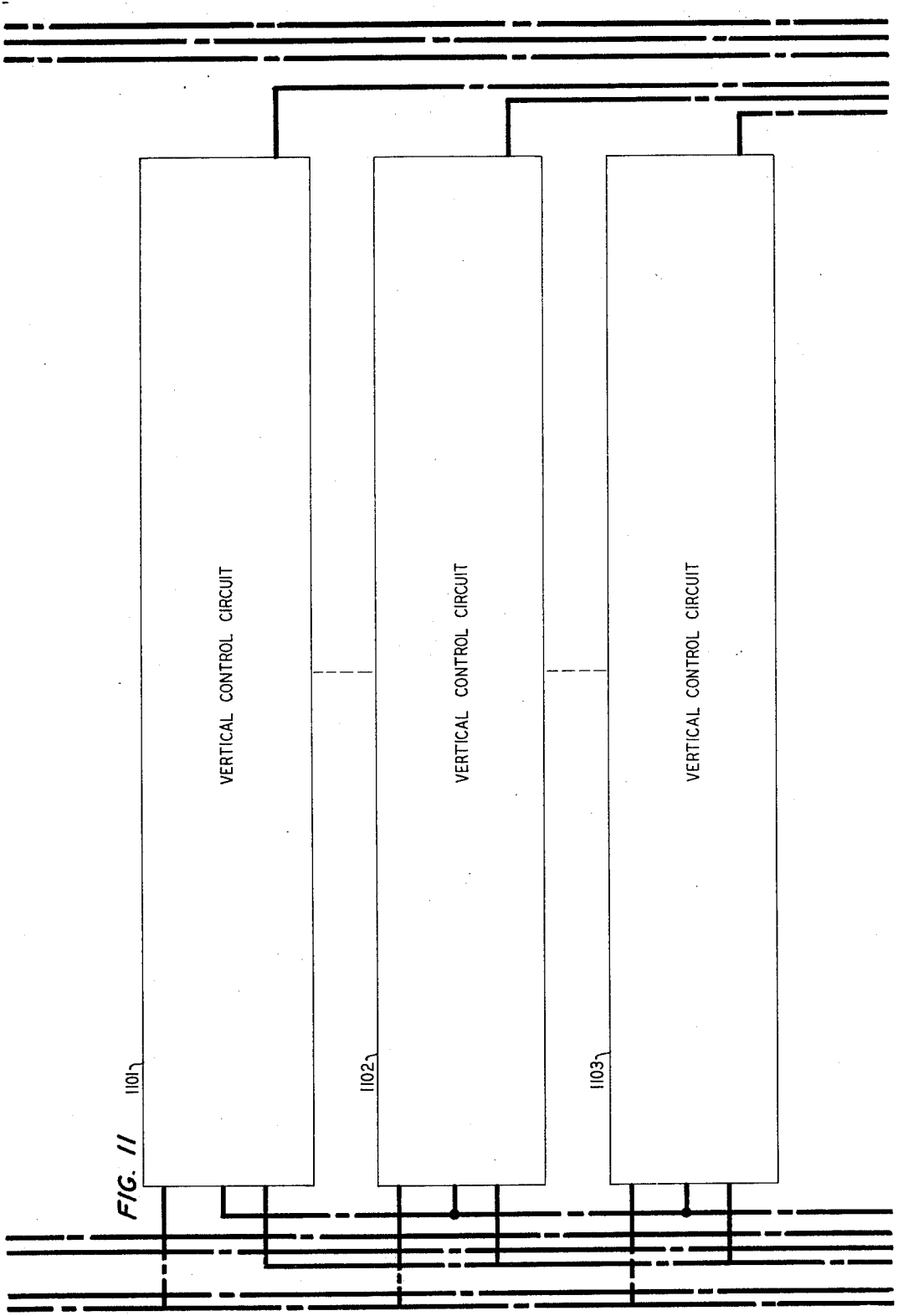
Figure 19:
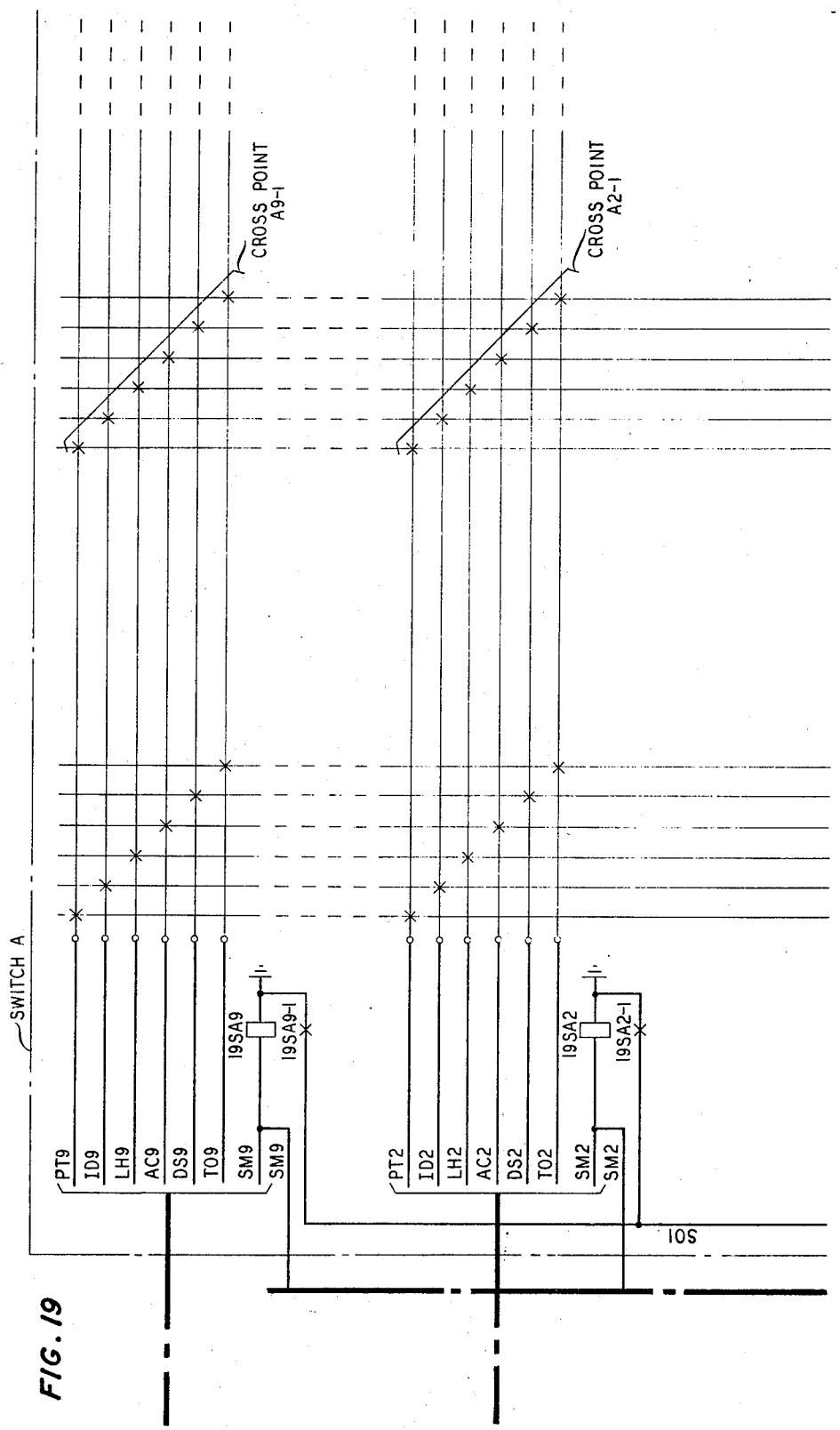
Figure 21:
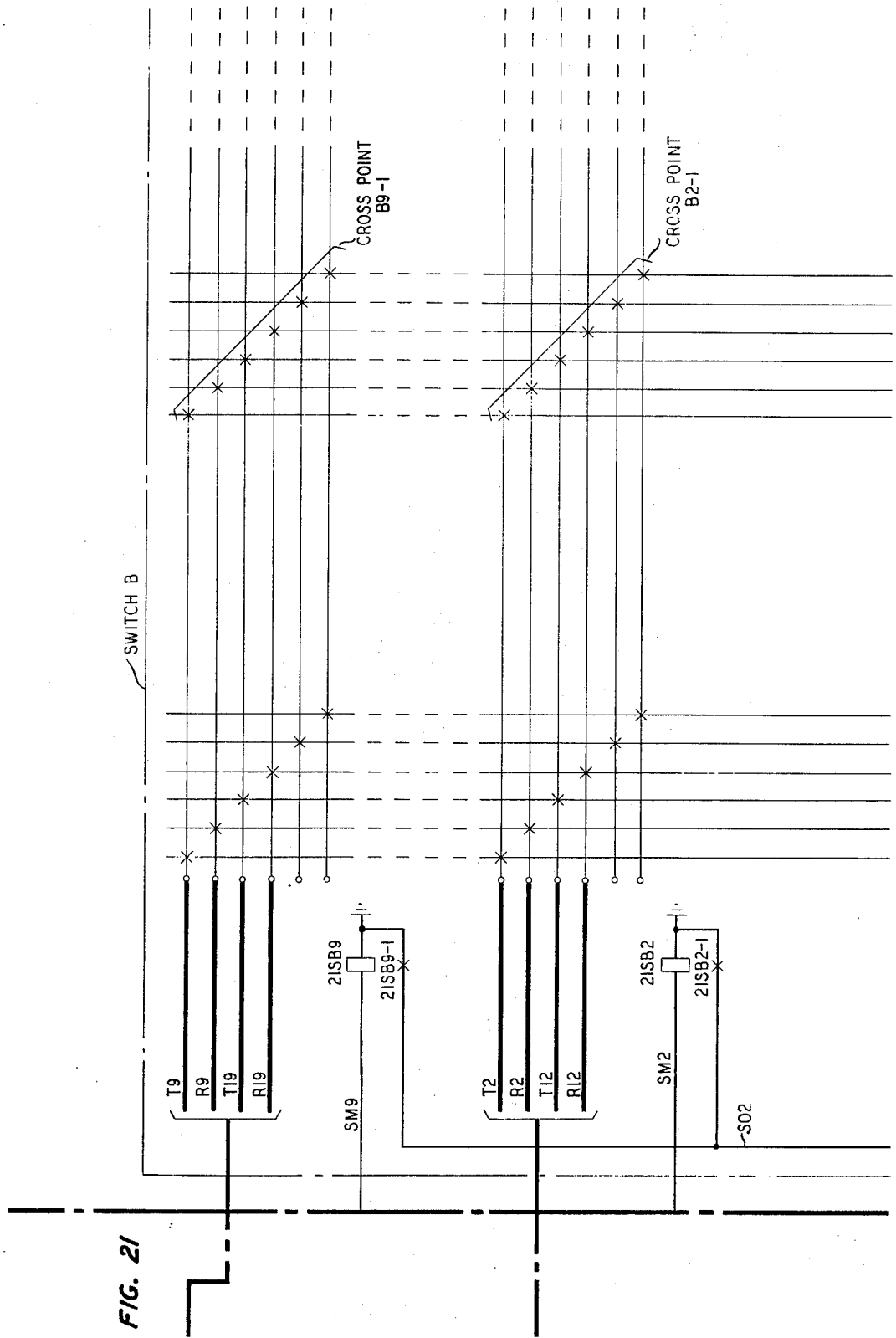

Prior to beginning a description of the manner in which trunk circuit 7 is selected by the attendant position, it will be noted that horizontal control circuit 901 which is shown in detail on FIGS. 9 and 10 of the drawing is associated with the third horizontal level of crossbar switch A in FIG. 19. It will be further noted as hereinbefore described, that horizontal control circuit 901 thus terminates only the control leads associated with trunk circuit 7. FIG. 21 shows the third horizontal level for switch B and also shows the transmission leads T2, R2, T12, and R12 which connect to horizontal level 3 and are terminated in conference bridge circuit 1417 in FIG. 14. It will be noted that the other side of conference bridge circuit 1417 is connected to trunk 7 in FIG. 7.

In order to select trunk 7 at this time, the attendant momentarily depresses nonlocking key T7 (FIG. 2A), thereby impressing ground potential on the K0 lead, which, as hereinbefore described, results in the operation of relay 3KO at this time. The enabled condition of relay 3KO removes ground from the KL lead of FIG. 4, thereby releasing any priorly operated key relay. The enabled condition of make contact 3KO–11 completes the aforedescribed operate path of relay 3KO1. Ground on the CK lead from trunk key circuit 7 in FIG. 2A is extended to FIG. 10 so as to complete the operate path of relay 10TK at this time. The enabling of break contact 3KO–8 (FIG. 3) opens the operate path of relay 3LAC and also removes battery from the ACB lead which extends to FIG. 9, thereby preventing the operation of relay 9AC. The operation of relay 3KO1 removes battery from the KB lead of FIG. 4, thereby preventing the operation of relay 10TK at this time. Relay 3KC operates through released break contacts 5LCO–11 and 3TCO–4 to ground. Upon the operation of relay 3KC, ground is reconnected to the KL lead of FIG. 4 and battery is reconnected to the KB lead of FIG. 4, thereby operating the selected 10TK relay.

The operation of relay 10TK completes the obvious operate path of relay 10TC. The enabled condition of transfer contact 10TK–3 (FIG. 9) extends fluttering lamp potential from signal generator circuit 902 to the trunk lamp TL lead, which extends to lamp T7 at the console position. Thus, at this time the lamp flutters as an indication to the attendant that trunk circuit 7 has been seized. The operation of relay 10TC extends ground via the enabled condition of make contacts 10TC–4 to the winding of the 9AC relay which remain released at this time. Relay 9TH operates from battery extended through enabled make contact 10TC–1 through the winding of relay 9TH to ground present on enabled make contact 10TC–6. Relay 3TCO also operates at this time by ground extended to the TC lead of FIG. 9 via enabled make contact 10TC–5.

The foregoing operations take place during the enabled (or operated) state of nonlocking key T7 at the console position. Upon the release of nonlocking key T7, relay 3KO releases. The release of relay 3KO operates relay 9AC at this time via ground extended on the ACB lead from FIG. 3. The release of relay 3KO provides a holding battery supply for the operated 10TK relay via lead KB which extends through released break contact 3KO1–5 (FIG. 4) to the KB lead of FIG. 10. The release of make contact 3KO1–1 releases relay 3KC at this time.

It will be noted that locking battery and ground for the TH relays, such as the TH relays associated with the horizontal control circuits 801 and 802, are arranged in a series chain circuit so that the operation of any of these relays releases any previously operated such relay and locks only the last one in an operated condition. The operation of relay 9TH operates relay 9LH at this time via the enabled make contact 9TH–12. The actual seizure of trunk circuit 7 is accomplished by the extension of ground potential to the A lead of FIG. 10 through enabled make contact 9LH–3. This ground potential completes the obvious operate path of relay 7AT in trunk circuit 7.

Figure 3:
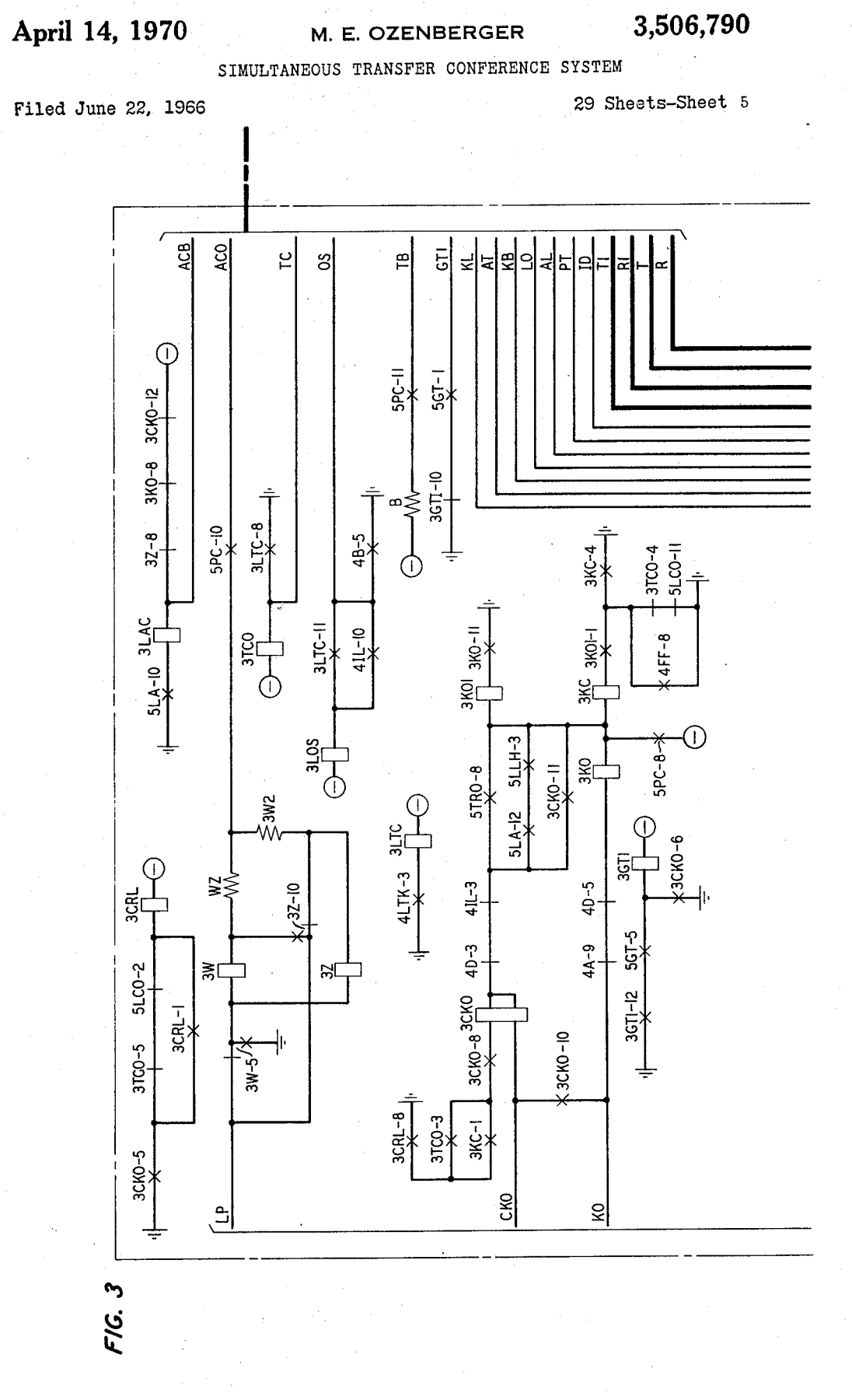

The transmission leads associated with the attendant's telephone circuit 203 are extended from their connection to one side of released contacts on the 3LAC relay (FIG. 6), via the T, R, T1, and R1 of FIG. 3 through operated make contacts on the 9AC relay in FIG. 10 to the console circuit input leads of the bridge associated with the selected trunk. In the instant case, the aforesaid leads are thus completed through to the R12, T12, R2, and T2 leads of conference bridge circuit 1417 in FIG. 14.

In similar fashion dial circuit 204 of FIG. 2C is extended from the attendant's telephone circuit 203 via the DT and DR leads to the correspondingly designated leads of horizontal control circuit 901 at FIG. 9 through enabled make contacts 10TK–1 and 10TK–2, respectively (FIG. 10), from which point the DT and DR leads are extended to the input of the hybrid circuit of trunk circuit 7. Thus, employing techniques well known in the art, dial pulses generated at dial pulse circuit 204 are repeated through the hybrid to leads T2 and R2 which lead to the direct distance dialing line and thus to the register equipment in the associated central office.

Accordingly, upon the completion of the aforedescribed circuit operation, a transmission path extends from console position circuit 6 through to the central office in the external telephone network and thus dial tone is received in the well-known fashion. Upon the receipt of such dial tone, the attendant dials the appropriate directory number resulting in a completion of a telephone communications path which extends from the distant called station, through trunk circuit 7, and via conference bridge circuit 1417 to the attendant at console position circuit 6.

2.06 Connection of conferee stations S1, S2 and S3 to the remote station via trunk circuit 7

Summarizing at this time; in the immediately preceding sections, circuit operation has ben described which has resulted in the interconnection in conference fashion of stations S1, S2 and S3. Such interconnection has been accomplished via their common connections through the crossbar switch field to local link circuit 12 which, as heretofore described, constitutes a conference bridge network. Immediately thereafter circuit operation has been described for the manner in which the attendant at console position circuit 6 released from the foregoing connection and established a connection to a remote station in the external telephone network via trunk circuit 7. This section will describe the manner in which the conferee stations are connected to the remote station via trunk circuit 7.

In order for the attendant at console position circuit 6 to cause the connection of the conferees' stations to trunk circuit 7, it is necessary for the position circuit to be reassociated with the local link. This may be accomplished in either of two distinct manners. The attendant may cause reassociation of console circuit 6 with local link circuit 12 by operating the LL12 key shown in FIG. 2B. Upon the enabling of key LL12, console position circuit 6 is disconnected from its association with trunk circuit 7 and is connected through to local link circuit 12 in the same manner as described for the selection of trunk circuit 7 upon the operation of trunk key T7.

In the alternative, the attendant may momentarily operate a line key associated with any of the conferee stations. As hereinbefore described, the operation of a line key causes the connection of console position circuit 6 through to the selected station (and thus in the instant case to all conferee stations) via local link circuit 12. The circuit action which precedes such connection is identical to that hereinbefore described.

For purpose of description, we shall assume that the attendant causes reassociation of the position circuit with local link 12, by the momentary operation of a line key such as line key L1 (FIG. 2B). Thus, at this time the selection of line circuit 1 takes place as hereinbefore described. Accordingly, relays 5LA and 5LLH are operated by ground extended on leads AC0 and LH0, respectively, through the crossbar switch field horizontal multiple. The operation of these relays connect battery to the upper and lower windings of relay 3CKO via enabled make contact 5PC–8, enabled make contact 5LLH–3, enabled make contact 5LA–12, and released break contacts 4IL–3 and 4D–3. The enabling of make contact 5LA–4 (FIG. 5) partially completes a circuit extending from ground to the TO0 lead of FIG. 5 which is extended to the TO0 lead of switch A at FIG. 20, and then via the horizontal multiple of that switch to the respectively closed crosspoints associated with all line circuits presently involved in the connection. Thus, the path is extended through crosspoint A0–9, via the T0–9 lead to the correspondingly designated lead of FIG. 13, through diode 1301 to one side of the winding of relay 13TR.

As will be more apparent hereinafter, upon the enabling of make contact 3CRL–2 (FIG. 5), ground will be extended via the aforedescribed path to cause the operation of each TR relay (such as relay 13TR), in all vertical control circuits associated with conferee station line circuits.

The enabling of conference key C7 in trunk key circuit 7 at this time completes the operate path of relay 3CKO in a manner similar to that priorly described for the operation of trunk key T7. Relay 3CKO operated causes the release of relay 3LAC at this time via the enabled condition of break contact 3CKO–12. In addition, ground present on the CKO lead of FIG. 3 is extended through enabled make contact 3CKO–10 to cause the operation of relay 3KO at this time.

The enabling of relay 3KO opens the hereinbefore described operate path of relays 12LK and 13LC. As also described hereinbefore, relay 3KO completes the operate path of relay 10TK which, however, does not operate at this time because of the prior opening of the KB lead as hereinbefore described.

The hereinbefore described operation of relay 3KO1 opens the operate path of the 4A relay via released break contact 3KO1–16. Concurrently therewith, the release of make contact 13LC–2 (FIG. 12) removes ground from the LC lead, thereby releasing relay 5LCO at this time.

Relay 3CRL operates from ground present on operated make contact 3CKO–5, via released break contacts 3TCO–5 and 5LCO–2 to the 3CRL winding. Similarly, relay 3KC operates through enabled make contact 3KO1-1 and released break contacts 3TCO-4 and 5LCO-11 to ground.

The enabling of make contact 3KC-8 (FIG. 4) extends ground to the KL lead and enabled make contact 3KC-11 extends battery to the KB lead of FIG. 4, thus operating relay 10TK at this time. The enabling of make contact 3CRL-2 in FIG. 5 completes a path from ground through to the TO0 lead of that figure, which, as earlier described, completes the operate path of each TR relay in each of the vertical control circuits associated with station S1, S2 and S3. The respectively operated TR relays (such as relay 13TR) lock operated via their respective TL leads to the TL lead of FIG. 5 which has ground present thereon because of the enabled condition of make contact 3CKO-1.

The aforedescribed circuit operation takes place during the enabled condition of conference key C7. The release of conference key C7 releases relays 3KO, 3KO1 and 3KC in a manner identical to that described hereinbefore for the release of trunk key T7. The release of break contacts 3KO1-16 completes the operate path of relay 4A which extends to ground through enabled make contacts 5TCO-1 and 3CRL-10. It will be apparent from the following description that the operation of relay 4A initiates a cycle whereby the line circuits associated with the conferee stations S1, S2 and S3 are disconnected from their connection through to local link circuit 12 and are reconnected through to conference bridge circuit 1417 and thus, of course, to trunk circuit 7 to the distant station.

The operation of the TR relays, as above described, prepare the respective vertical control circuits for transfer of the connection by: (a) transferring the respective HR relay windings (such as relay 13HR) from their normal locking paths to a common VC lead which extends to FIG. 4 and thus to ground; (b) connecting the HO- and HN- leads from the hold magnet off normal contacts (such as 24HA9-1 in FIG. 24) to the correspondingly designated leads of the respective vertical control circuits; such as the HN9 and HO9 leads shown in FIG. 13 through to the HN and HO leads shown in FIG. 4 (as will be described subsequently, hold magnet control is performed in FIG. 4); (c) providing a holding ground on the respective A leads leading to each of the line circuits to prevent their release during the interval in which the respectively associated HR relays are non-operated during the transfer function.

The aforedescribed operation of relay 4A extends battery through resistance AC to one side of the 4B relay winding. However, relay 4B does not operate at this time because of a shunting ground present on the HO lead. The respective HR relays, such as relay 13HR are released at this time because of the removal of ground from the VC lead of FIG. 4 by the enabled condition of break contact 4A-3.

The release of the respective HR relays releases the associated HA and HB hold magnets. Thus, at this time hold magnets 20HA1, 24HA5, 24HA9, 22HB1, 26HB5 and 26HB9 are released. Thus, the associated crosspoints are released. Accordingly, the line circuits for stations S1, S2 and S3 and the vertical control circuits associated therewith are released from their connection through to local link circuit 12.

Referring to FIG. 20, it will be noted that the release of the associated crosspoints interrupts the continuity of the LH0 lead which extends to FIG. 5 and which priorly provided an operating circuit for relay 5LLH. Accordingly, relay 5LLH releases, thereby opening the enabling path of lamp LL12, extinguishing the lamp at this time. The non-lighted condition of lamp LL12 thereupon indicates the availability of local link circuit 12 for use on other calls.

Upon the release of the HA hold magnets, the aforedescribed shunting ground present on lead HO of FIG. 4 is removed, thereby permitting the operation of relay 4B at this time. The enabling of make contact 4B-1 closes through battery to one side of the winding of relay 6C. However, relay 6C does not operate because of the shunting ground present through released break contacts on the 6SO1 and 6SO2 relays. The enabling of make contact 4B-5 extends ground to the OS lead of FIG. 3 and via the correspondingly designated lead of FIG. 9 to operate relay 9OS. The enabled condition of make contact 9OS-8 (FIG. 10) extends battery potential to the SM2 lead which results in the enabling of the associated horizontal level in crossbar switches A and B at this time. Thus, select magnet 19SA2 operates at this time. In similar fashion, select magnet 21SB2 also operates via the multipling between switches A and B of the crossbar switch field.

The enabling of the aforesaid select magnets extends ground potential as hereinbefore described so as to operate relays 6SO1 and 6SO2 at this time. The enabling of break contacts 6SO1-1 and 6SO2-1 (FIG. 6) removes the aforedescribed shunting ground from relay 6C permitting relay 6C to operate. The enabling of make contacts 6C-12 extends battery potential to one side of relay 4D. However, relay 4D does not operate at this time because of the shunting ground present on the HN lead which extends from the released hold magnet off normal contacts. Relay 13HR and the other HR relays associated with the involved vertical control circuits are thereupon operated by ground which extends via the VC lead from FIG. 4 through enabled make contact 6C-8. The operation of the HR relays extends ground to the respective HM leads thereby causing the operation of the associated hold magnets at this time. Thus, for example, enabled make contact 13HR-5 extends ground to the HM9 lead which is connected through to the correspondingly designated lead of FIG. 24 so as to enable hold magnet 24HA9 and 26HB9 at this time.

It will thus be obvious from the foregoing that crosspoints A0-1, B0-1, A0-5, B0-5, A0-9 and B0-9 have been released. It will also be obvious that as a result of the aforedescribed operation of select magnets 19SA2 and 21SB2 followed by the sequential enabling of hold magnets 20HA1, 22HB1, 24HA5, 26HB5, 24HA9, and 26HB9 that crosspoints A2-1, A2-5, A2-9, B2-1, B2-5, and B2-9 are now enabled. The closure of this latter group of crosspoints closes through the three lines circuits associated with the respective three verticals to the single horizontal level leading to conference bridge circuit 1417 and thus to trunk circuit 7.

The operation of the aforesaid hold magnets removes ground potential from each of the associated HN leads which extend to FIG. 4 thus removing the aforedescribed shunt from the operate path of relay 4D, permitting relay 4D to operate at this time. The enabling of break contact 4D-3 opens the previously described operate path of relay 3CKO. The subsequent release of transfer contact 3CKO-4 opens the locking path of relay 5LA, also releasing that relay at this time.

Upon the release of relay 3CKO, the aforedescribed operate path of relay 9AC is completed via battery placed on the ACB lead of FIG. 3 through a chain of break contacts including released break contact 3CKO-12. The TR relays associated with the respective vertical control circuits are also released via the removal of ground from the TL lead of FIG. 5 because of the released condition of make contact 3CKO-1. Relay 3CRL also releases at this time via released make contact 3CKO-5. The release of transfer contact 13TR-6 places the operated condition of the 13HR relay winding under control of its locking path through 13TR-6 released, released break contact 13RL-10 and enabled make contact 13HR-3 to ground. It will, of course, be obvious that the HR relays associated with other vertical control circuits are similarly affected at this time. The release of make contact 13TR-12 removes ground from the TR lead of FIG. 12 thus opening the operate path of relay 5TRO whch releases.

The release of make contact 3CRL-10 opens the operate path of relay 4A. Upon the release of make contact 4A-10, relay 4B also releases. The release of make contact 4B-1 causes the release of relay 6C. In similar fashion, the release of make contact 4B-5 removes ground from the OS lead of FIG. 3 thereby resulting in the release of relay 9OS at this time. The release of relay 9OS opens the aforedescribed operate path of the select magnets. Thus, the select magnets also release. The release of the select magnets remove ground from the SO1 and SO2 leads of FIG. 6, thus releasing relays 6SO1 and 6SO2 at this time. The aforedescribed release of relay 6C restores make contact 6C-12 to normal thus releasing relay 4D. At this point all common control relays associated with the establishment of the aforedescribed connection have released. Accordingly, controller circuit 5 is now available to serve other connections in similar fashion.

2.07 Attendant release

The aforedescribed release of relay 3LAC interrupts the continuity of the T1, R1 T, and R conductors (FIG. 6) thereby disconnecting the attendant's telephone circuit from local link circuit 12. The aforedescribed operation of relay 9AC extends the aforesaid conductors through enabled make contacts on the 9AC relay (at FIG. 10) through to the correspondingly designated leads of conference bridge circuit 1417 and thus places the attendant's telephone circuit in communication with the conferee stations connected to trunk circuit 7. This section will describe the manner in which the attendant affects release of the console position from this connection.

It will be noted by an inspection of FIG. 2C that ground on the PC lead may be removed either by momentary operation of attendant release key 207 or by the attendant telephone circuit being placed in an unhook condition so as to release switchhook contacts 205. For purpose of the description we shall assume that the attendant momentarily operates attendant release key 207 thereby removing ground from the PC lead of FIG. 2C which extends to the correspondingly designated lead of FIG. 5. Thus, the operate of relay path 5PC is opened.

The release of relay 5PC removes battery from the KB lead of FIG. 3 thereby opening the aforedescribed operate path of relay 10TK. Relay 10TC thereupon releases, releasing make contact 10TC-4, thus opening the operate path of relay 9AC.

The release of make contacts 9AC-11, 9AC-10, 9AC-9 and 9AC7 interrupts the continuity of the connection of the T1, R1, T, and R conductors, which, as earlier described, had extended from the attendant telephone circuit through to trunk circuit 7. It will thus be obvious from the foregoing that the attendant console position 6 has released from the connection and is now available to complete other connections as hereinbefore described.

2.08 Incoming call to attendant console position circuit 6 via truck circuit 8

Figure 7:
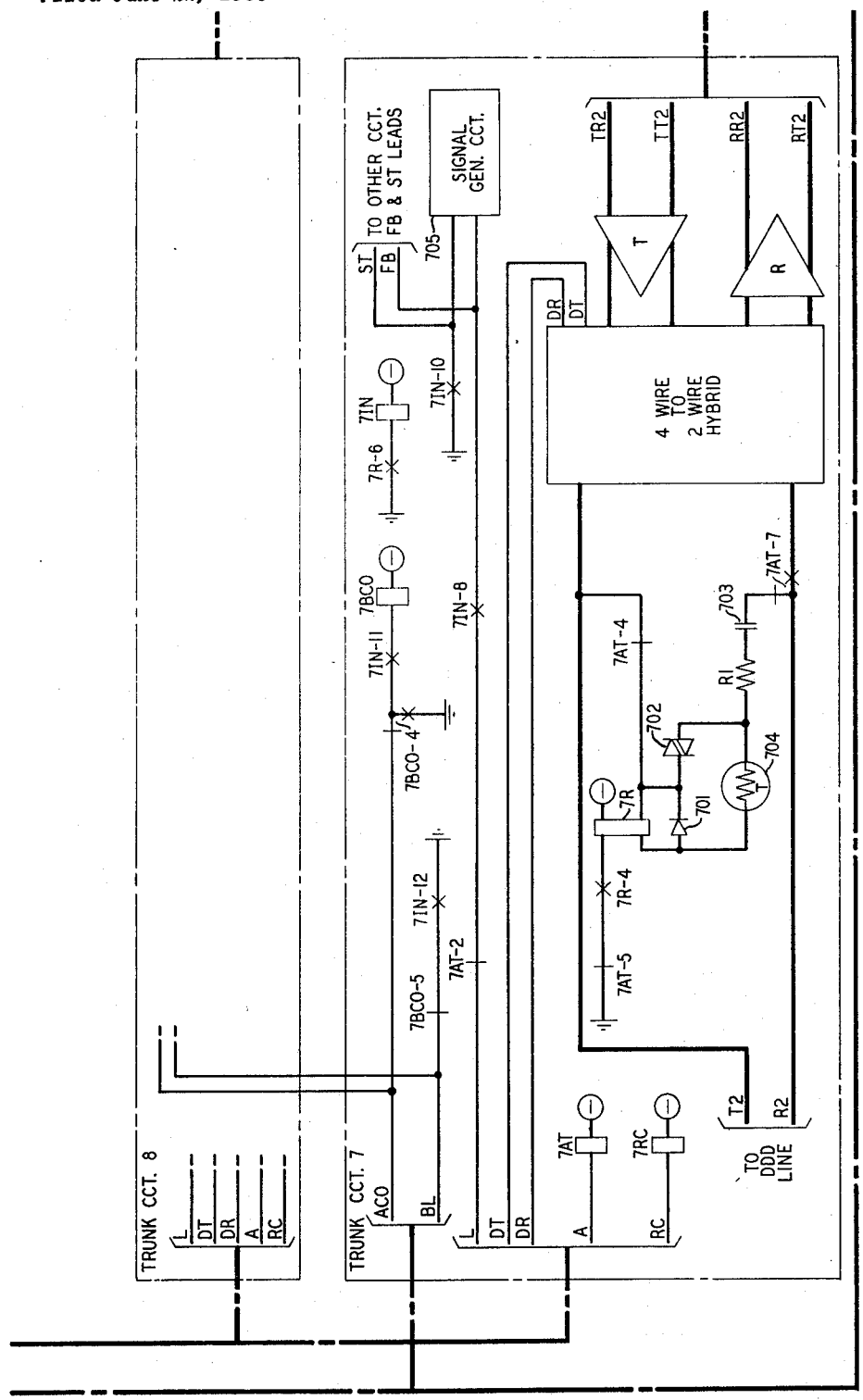
Figure 8:
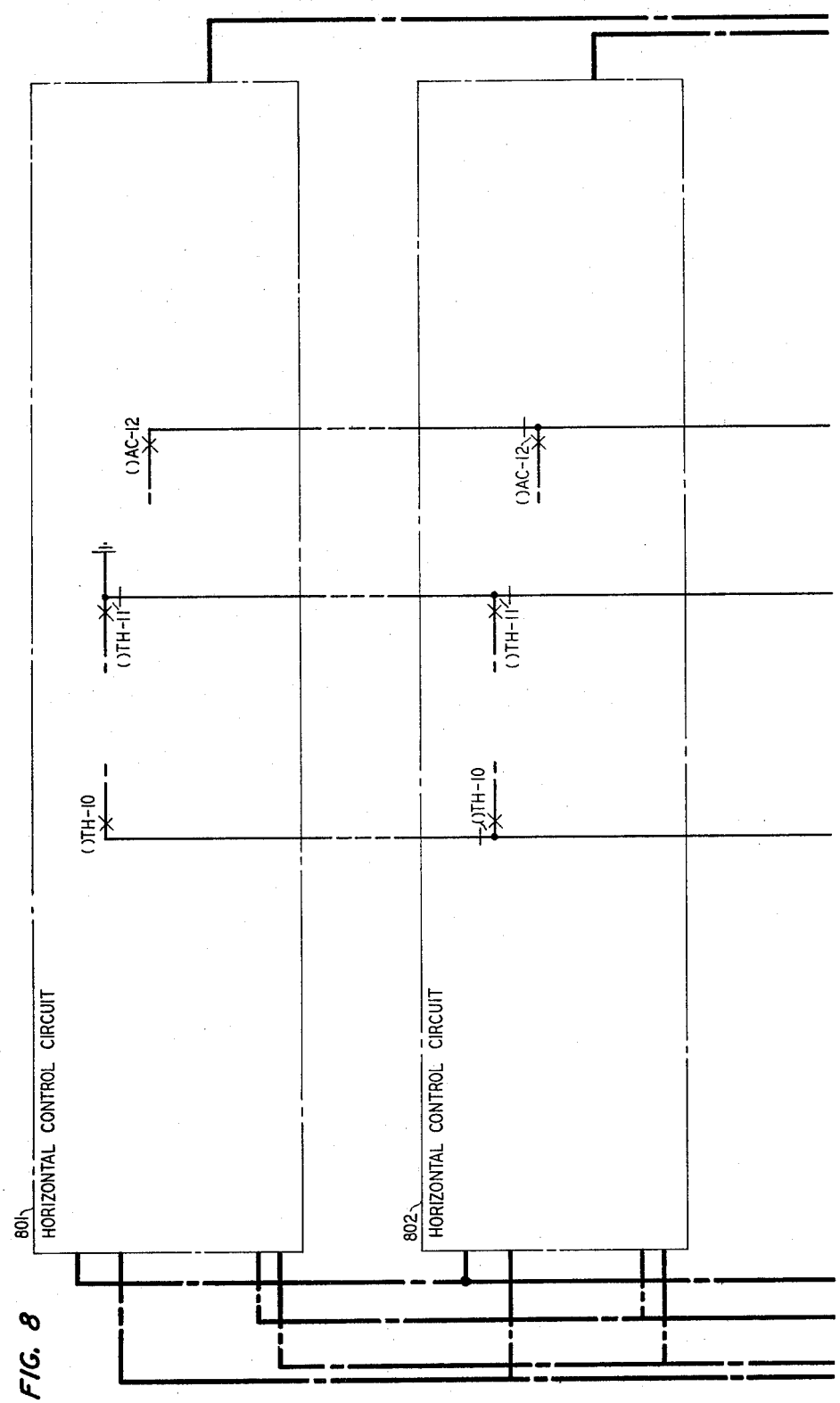

This section shall describe the manner in which an incoming call is completed through to console position circuit 6. Referring at this time to FIG. 7, we shall assume in this description that the incoming call arrives via trunk circuit 8. It is noted that trunk circuit 8 is not shown in detail. However, the circuit operation of trunk circuit 7, as earlier stated, is identical to that of trunk circuit 8. Accordingly, circuit action in connection with an incoming call via trunk circuit 8 will be described with reference to the circuitry shown for trunk circuit 7, which we shall assume initially to be idle.

Upon the occurrence of an incoming call, the T2 and R2 leads are seized at the local central office in the well-known fashion. When ringing current is applied at the central office to the T2 and R2 leads of the trunk, the AC component flows through the break contacts of the 7AT relay, via capacitor 703, resistance R1, thermistor 704 and the lower winding of relay 7R and back to the T2 lead on one-half of the cycle. On the other half of the AC cycle diode 701 conducts and shunts the ringing current around the winding of relay 7R back to the T2 lead. Thus, diode 701 functions as a half-way rectifier. Varistor 702 is provided to protect diode 701 and thermistor 704 from transient currents. Thermistor 704 has an initial resistance sufficiently high to prevent relay 7R from operating when ringing current is first applied, thereby preventing false operation of relay 7R on disconnection or upon the occurrence of other transients. Power absorbed from the ringing current during the course of the incoming call increases the temperature of thermistor 704 and reduces its resistance sufficiently to permit enough current to flow to operate relay 7R via its lower winding. Relay 7R thereupon locks operated through enabled make contact 7R-4 and released break contact 7AT-5 to ground.

The enabling of make contact 7R-6 operates relay 7IN at this time. Enabled make contact 7IN-10 places ground potential on the ST lead to signal generator circuit 705 so as to enable that circuit at this time. The enabling of make contact 7IN-8 extends lamp potential from signal generator circuit 705 to the L lead which, as hereinbefore described, is connected through released break contacts on control relays in the horizontal control circuit of controller circuit 5 to the trunk lamp associated with the calling trunk circuit. Thus, in the instant case, the potential for enabling the lamp at console position circuit 6 is extended via the TL lead to enable lamp T8 at this time in a flashing manner, thus visually indicating to the attendant that an incoming call exists on trunk circuit 8.

In order to complete a connection from console position circuit 6 through to incoming trunk circuit 8, the attendant momentarily operates non-locking key T8 at the console. As hereinbefore described for the selection of trunk circuit 7, the enabling of the associated non-locking key at the console position results in the operation of the associated AT relay (7AT) in the associated trunk circuit. The operation of relay 7AT opens the upper winding holding path of relay 7R, thereby releasing the 7R relay. The release of enabled make contact 7R-6 releases relay 7IN. As also earlier described, the T8 lamp at console position circuit 6 thereupon changes from a flashing to a fluttering state indicating seizure of the associated trunk.

In addition, a continuous communications path thereupon exists from the calling station in the outside telephone network through trunk circuit 8, conference bridge circuit 1418 and thence through the associated horizontal control circuit in a manner similar to that earlier described for trunk circuit 7 to the T1, R1, T, and R leads of FIG. 3 in controller circuit 5 and from that point to FIG. 6 and thence via the TT, TR, RT, and RR leads from FIG. 6 to the correspondingly designated lead of FIG. 2C which, as earlier described, terminate in the attendant telephone circuit.

For purpose of the description we shall assume that a conversation takes place between the attendant at console position circuit 6 and the calling station via trunk circuit 8. We shall further assume that this telephone conversation indicates the need for the transfer of all conferee stations from their present association with trunk circuit 7 to an association with trunk circuit 8.

2.09 Transfer of conferee stations S1, S2 and S3 from their present connection 7 to a connection with trunk circuit 8.

In order to affect the transfer, the attendant performs the following operations in sequence: (a) the attendant reselects the trunk presently associated with the lines which are to be transferred. This is accomplished by operating the associated trunk key which in the present case is trunk key T7 shown on FIG. 2A; (b) thereafter, the attendant simultaneously operates the group transfer key 206 (shown on FIG. 2C) and the conference key C8 associated with the trunk to which conferee stations are to be transferred.

Upon the momentary enabling of key T7 (FIG. 2A) in order to reselect trunk 7, relay 3TCO operates as hereinbefore described. The enabling of relay 3TCO prepares the operate path of relay 5GT via the enabling of make contact 3TCO–2. As will be more apparent from that which is contained hereinafter, the enabling of relay 5GT activates the transfer cycle. In addition to the foregoing, for purposes which will be obvious in the immediately succeeding description, the enabling of relay 10TC which as hereinbefore described takes place upon the operation of trunk key 7, closes make contacts 10TC–7 (FIG. 10) so as to extend continuity between the GT1 lead and lead TO2.

As earlier set forth, having selected the trunk from which the lines are to be transferred, the attendant simultaneously operates both the group transfer key 206 (FIG. 2C) and the conference key C8 (FIG. 2A) of the trunk to which the lines are to be transferred. Upon the enabling of group transfer key 206, ground is extended from the GT lead of FIG. 2C to the correspondingly designated lead of FIG. 5 so as to operate relay 5GT at this time. The enabling of relay 5GT closes make contact 5GT–1, thereby extending ground to the GT1 lead of FIG. 3 and from that point to the correspondingly designated lead of FIG. 10 from which point the ground potential is extended through enabled make contact 10TC–7 to the TO2 lead which, in turn, is extended to the correspondingly designated lead of FIG. 19 and thus via the horizontal multiple of crossbar switch A through each of the respective crosspoints A2–1, A2–5, and A2–9 to the associated vertical control circuits associated therewith. Thus, for example, the TO2 lead is extended by the horizontal multiple of switch A of FIG. 19 through to the vertical multiple lead TO9 in FIG. 24 which, in turn, is extended to the correspondingly designated lead of FIG. 13 so as to complete the operate path of relay 13TR. It will be obvious, of course, that in addition to the operation of relay 13TR, the TR relays in the vertical control circuits associated with the other line circuits will also be enabled at this time. Thus, at this time the vertical control circuits are prepared for transfer by operation of their respective TR relays.

The aforementioned operation of conference key C8 thereupon causes the vertical control circuits associated with each of the line circuits and the horizontal control circuit associated with trunk circuit 8 to function, as hereinbefore described, for the transfer of the aforesaid lines from local link circuit 12 to trunk circuit 7. Accordingly, at this time crosspoints A2–1, A2–5 and A2–9 are released. The release of the crosspoints is brought about as earlier described upon release of hold magnets 20HA1, 22HB1, 24HA5, 26HB5, 24HA9, and 26HB9. Upon the release of these hold magnets, the select magnets associated with trunk circuit 8, namely, select magnets 19SA9 and 21SB9 are enabled followed by the reoperation of the above mentioned hold magnets. As a result, new crosspoints are now closed in the crossbar switch field; specifically, crosspoints A9–1, A9–5, A9–9, B9–1, B9–5, and B9–9.

It will thus be obvious from the foregoing that stations S1, S2 and S3 are connected via their respective line circuits through the vertical multiple of crossbar switch field 4 to the uppermost horizontal level in the crossbar switch field and thus via the enabled crosspoints to trunk circuit 8. At this time a conference connected may take place between stations S1, S2 and S3 and the calling station associated with trunk circuit 8. Upon the release of the remote station associated with trunk circuit 7, as earlier described, trunk circuit 7 releases in the conventional manner. It is, of course, also obvious that the remote station associated with trunk circuit 7 may, in fact, be connected through to another line or group of lines accessible via console position circuit 6 in a manner similar to that described for the recently completed connection with respect to trunk 8.

2.10 Release of conference connection

It will be noted by an examination of line circuit 10 as shown on FIGS. 16 and 17 that station S1 may release from the conference connection merely by returning the subset to an onhook position. Upon so doing, relay 16S will release since, as earlier described, the operate path of relay 16S extends through switchhook contacts SW1 of substation S1. The release of make contacts 16S–4 releases relay 17S1. The release of make contact 17S1–10 removes battery from the L lead thereby providing a visual indication to the attendant at console position circuit 6 that station S1 has abandoned the connection. In similar fashion, relay 17SM releases because of the released condition of make contacts 17S1–2. Lead RL (FIG. 17) is thereupon grounded by ground potential extended through released break contact 16S–5 and enabled make contact 16AM–5. This ground potential is extended via the RL lead to the correspondingly designated lead in the associated vertical control circuit 1201 at FIG. 13 so as to cause the operation of relay 13RL. The operation of relay 13RL restores to normal the control relays in vertical control circuit 1201. Thus, as a result, ground is removed from the A lead which extends from FIG. 12 of vertical control circuit 1201 to the correspondingly designated lead of line circuit 10 at FIG. 17. Thus, relay 17AL releases at this time. The release of make contact 17AL–9 thereupon releases relay 16AM, thereby restoring line circuit 10 to normal.

It will be obvious from the immediately preceding description that the release of a line circuit, such as line circuit 10, by virtue of the disconnection by station S1 in no way interferes with the continued operation of the conference connection hereinbefore described. Thus, although station S1 may abandon the call at this point, the existing conference arrangement remains established until the release of all stations in the same manner as immediately hereinbefore described for station S1.

It is also obvious, however, that, upon the release of all three stations, that their respective LH leads will no longer find continuity through the crossbar switch field. For example, with reference to vertical control circuit 1201, upon release of vertical control circuit 1201, ground it removed from the HM9 lead thereby interrupting the priorly described operate path of the hold magnet associated with crosspoint A9–9. The LH9 lead which extends from FIG. 13 through the crosspoints A9–9 is thus interrupted. Accordingly, the ground provided on the LH9 lead, which extends via the horizontal level to trunk circuit 8 will be removed. The absence of this ground potential by virtue of the release of a single line circuit will have no immediate significance since ground potential is still provided via LH leads associated with active stations. However, upon the release of the line circuit associated with the last station involved in the conference connection, ground will no longer be present at all on the LH lead of the horizontal associated with the trunk. The corresponding LH relay in the associated horizontal control circuit will then release.

For purpose of description, we shall trace the resultant release of the 9LH relay in horizontal control circuit 901. As earlier set forth, the identical circuit operation would take place with respect to the apparatus provided in horizontal control circuit 802 which is involved in the instant connection. Thus, upon the release of relay 9LH, transfer contact 9LH–3 (FIG. 10) restores to normal, thereby removing ground from the A lead which extends from FIG.

10 to the correspondingly designated lead of trunk 8 in FIG. 7. The absence of ground on the A lead of trunk circuit 8 results in the release of that circuit in the same manner as heretofore described for trunk circuit 7. Upon the release of the line circuits associated with stations S1, S2 and S3 and the subsequent release of trunk circuit 8, all priorly enabled apparatus has restored to normal. Trunk circuit 8 is thereupon available to be used as hereinbefore described in connection with the establishment of incoming calls, outgoing calls, and conference connections involving stations served by attendant console position circuit 6.

2.11 Summary

While the equipments of this invention have been described with reference to a particular embodiment whereby an attendant position exercises control of the interconnection of a plurality of telephone stations, the connection of such stations to a trunk, and the subsequent transfer en masse of such stations to another trunk, it is to be understood that such an embodiment is intended merely to be illustrative of the principles of the invention and that numerous other arrangements may be devised by those skilled in the art without departing from the spirit and scope of the invention.

For example, the invention may be used where the conferees are constituted by a plurality of radio as opposed to wire line circuits.

Another example would be where the conferee stations are accessible to the controlling console position through a respective plurality of trunk circuits leading to remote destinations.

What is claimed is:

1. In a communication system,
    a plurality of communication channels,
    a plurality of stations,
    selectively operable means for interconnecting certain of said stations,
    individual means for connecting each of said certain stations to one of said channels, and
    means for simultaneously transferring each of said certain stations to another of said channels.

2. In a telephone system,
    a console position comprising a plurality of nonlocking trunk keys, a plurality of nonlocking line keys, and a special key,
    a plurality of trunks,
    a plurality of lines,
    means responsive to the operation of certain said line keys for interconnecting a plurality of said lines,
    means responsive to the operation of one of said trunk keys for connecting said interconnecting lines to a particular trunk, and
    means responsive to the simultaneous operation of another of said trunk keys and said special key for transferring the connection of said interconnected lines to another trunk.

3. In a telephone system,
    a plurality of trunks,
    a plurality of lines,
    and a console position comprising selectively operable means for interconnecting certain of said lines as a conference group,
    individual means for simultaneously connecting each of said grouped conference lines to one of said trunks, and
    means for simultaneously transferring the connection of each of said grouped conference lines from said one trunk to any other said trunk.

4. The combination set forth in claim 3 further comprising a switching network having a network location for each said line and a network location for each said trunk, and wherein said transfer means comprises means for
    recording the network location of each said interconnected line,
    means for releasing the connection of each said interconnected line in said network, and
    means controlled by said recording means for reconnecting the said interconnected lines in said network.

5. In a telephone switching system,
    a crossbar switch network comprising vertical units and horizontal units,
    a plurality of lines each exclusively connected to the vertical units of said network,
    a plurality of trunks each exclusively connected to the horizontal units of said network,
    a console position comprising a plurality of selectively operable keys,
    control means responsive to the operation of certain of said keys for operating one of said horizontal units and certain of said vertical units, and
    means responsive to the simultaneous operation of two other of said keys for releasing said operated vertical units and said one operated horizontal unit and
    means for operating another horizontal unit and reoperating said released vertical units.

6. The combination set forth in claim 5 further comprising means responsive to the said operation of each said horizontal unit for selecting the trunk associated therewith, and
    means responsive to the said release of said one operated horizontal unit for releasing said selected trunk.

7. The combination set forth in claim 5 wherein said transferring means comprises means for registering the identity of said operated vertical units prior to the said release thereof.

8. In a telephone switching system,
    a switching network,
    a plurality of lines connected to said network,
    a plurality of trunks connected to said network,
    selectively operable means,
    control means responsive to the operation of said selectively operable means for individually interconnecting certain of said lines through said network to an arbitrarily selected one of said trunks, and
    means responsive to the further operation of said selectively operable means for transferring the said individual connections of said lines from said selected trunk to any other arbitrarily selected trunk.

References Cited

UNITED STATES PATENTS

| 2,154,579 | 4/1939 | Parrott | 179—42 |
|---|---|---|---|
| 3,384,717 | 5/1968 | Coston. | |
| 3,099,719 | 7/1963 | Gerbore et al. | |
| 3,322,901 | 5/1967 | Trimmer. | |

WILLIAM C. COOPER, Primary Examiner

U.S. Cl. X.R.

179—1